United States Patent
Nguyen et al.

(10) Patent No.: US 10,287,867 B2
(45) Date of Patent: May 14, 2019

(54) ENHANCING COMPLEX FRACTURE NETWORKS IN SUBTERRANEAN FORMATIONS

(71) Applicant: Halliburton Energy Services, Inc., Houston, TX (US)

(72) Inventors: Philip D. Nguyen, Houston, TX (US); Dipti Singh, Kingwood, TX (US); Prashant D. Chopade, Kingwood, TX (US); Travis Hope Larsen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/753,905

(22) PCT Filed: Sep. 23, 2015

(86) PCT No.: PCT/US2015/051592
§ 371 (c)(1),
(2) Date: Feb. 20, 2018

(87) PCT Pub. No.: WO2017/052522
PCT Pub. Date: Mar. 30, 2017

(65) Prior Publication Data
US 2018/0238160 A1    Aug. 23, 2018

(51) Int. Cl.
*E21B 43/267* (2006.01)
*C09K 8/80* (2006.01)
(Continued)

(52) U.S. Cl.
CPC ............ *E21B 43/267* (2013.01); *C09K 8/601* (2013.01); *C09K 8/80* (2013.01); *E21B 43/26* (2013.01);
(Continued)

(58) Field of Classification Search
None
See application file for complete search history.

(56) References Cited

U.S. PATENT DOCUMENTS 4,078,609 A * 3/1978 Pavlich ................. E21B 33/138
166/271
6,776,235 B1 * 8/2004 England ................ E21B 43/267
166/271
(Continued)

FOREIGN PATENT DOCUMENTS

WO    WO-2013070357 A2    5/2013

OTHER PUBLICATIONS

Liu et al.; Proppant Placement Using Reverse-Hybrid Fracs; 2006; Society of Petroleum Engineers; pp. 1-11 (Year: 2006).*
(Continued)

*Primary Examiner* — Anuradha Ahuja
(74) *Attorney, Agent, or Firm* — McGuireWoods LLP

(57) ABSTRACT

Methods including creating or extending a first main fracture with a pad fluid into a subterranean formation, wherein the pad fluid is a high-viscosity fluid; alternatingly introducing a micro-proppant fluid with the pad fluid, wherein the micro-proppant fluid is a low-viscosity fluid comprising micro-sized proppant particulates; creating or extending a first branch fracture extending from the first main fracture with the alternatingly introduced micro-proppant fluid, whereby at least a portion of the micro-sized proppant particulates enter into the first branch fracture and form at least a partial monolayer of micro-sized proppant particulates therein; and introducing a macro-proppant fluid through the first opening at a second flow rate, wherein the macro-proppant fluid is a low-viscosity fluid comprising macro-sized proppant particulates, and whereby at least a
(Continued)

portion of the macro-sized proppant particulates enter into the first main fracture and form a proppant pack therein.

18 Claims, 4 Drawing Sheets

(51) Int. Cl.
*C09K 8/60* (2006.01)
*E21B 43/26* (2006.01)

(52) U.S. Cl.
CPC ...... *C09K 2208/24* (2013.01); *C09K 2208/26* (2013.01)

(56) References Cited

U.S. PATENT DOCUMENTS

| | | | |
|---|---|---|---|
| 7,044,220 B2 | 5/2006 | Nguyen et al. | |
| 7,281,581 B2 | 10/2007 | Nguyen et al. | |
| 7,346,345 B2 | 3/2008 | Ruutu et al. | |
| 7,718,584 B2 | 5/2010 | Welton et al. | |
| 7,946,345 B2 | 5/2011 | Nguyen | |
| 8,109,335 B2 | 2/2012 | Luo et al. | |
| 8,205,675 B2 * | 6/2012 | Brannon | C09K 8/602 166/280.1 |
| 8,540,021 B2 | 9/2013 | McCarter et al. | |
| 8,607,870 B2 | 12/2013 | Gu et al. | |
| 8,613,314 B2 | 12/2013 | Garcia-Lopez De Victoria et al. | |
| 8,863,842 B2 | 10/2014 | Nguyen et al. | |
| 8,881,813 B2 | 11/2014 | Nguyen | |
| 8,975,217 B2 | 3/2015 | Reddy et al. | |
| 2003/0054962 A1* | 3/2003 | England | C09K 8/62 507/117 |
| 2006/0113077 A1* | 6/2006 | Willberg | C09K 8/42 166/280.1 |
| 2007/0193745 A1* | 8/2007 | Fulton | C09K 8/80 166/280.2 |
| 2007/0256838 A1* | 11/2007 | Baxter | C09K 8/64 166/308.3 |
| 2009/0107671 A1* | 4/2009 | Waters | C09K 8/685 166/280.1 |
| 2012/0004148 A1 | 1/2012 | Ogle et al. | |
| 2012/0111565 A1* | 5/2012 | Garcia-Lopez De Victoria | E21B 43/267 166/280.1 |
| 2012/0125617 A1* | 5/2012 | Gu | E21B 43/267 166/308.1 |
| 2013/0048282 A1 | 2/2013 | Adams et al. | |
| 2013/0105157 A1* | 5/2013 | Barmatov | C09K 8/685 166/280.1 |
| 2013/0284337 A1 | 10/2013 | Croissant | |
| 2014/0014338 A1* | 1/2014 | Crews | E21B 43/26 166/280.1 |
| 2014/0034309 A1 | 2/2014 | Saini et al. | |
| 2014/0251626 A1 | 9/2014 | Gomaa et al. | |
| 2014/0262291 A1 | 9/2014 | Chen et al. | |
| 2014/0299318 A1 | 10/2014 | Crews et al. | |
| 2014/0299326 A1 | 10/2014 | Crews | |
| 2015/0204178 A1* | 7/2015 | Willberg | C09K 8/68 166/280.2 |
| 2016/0201441 A1* | 7/2016 | Medvedev | C09K 8/805 166/280.2 |

OTHER PUBLICATIONS

Liu et al.; Proppant Placement Using Reverse-Hybrid Fracs; 2007; Society of Petroleum Engineers; pp. 348-356 (Year: 2007).*
Malhotra et al.; Proppant Placement Using Alternate-Slug Fracturing; 2013; Society of Petroleum Engineers; pp. 1-16 (Year: 2013).*
Ingram et al., "Methods Improve Stimulation Efficiency of Perforation Clusters in Completions," Journal of Petroleum Technology, Apr. 2014, pp. 32-36.
Ishida et al., "Influence of Fluid Viscosity on the Hydraulic Fracturing Mechanism," Transactions of the ASME, Sep. 2004, vol. 126, pp. 190-200.
Soliman et al., "Fracturing Design Aimed at Enhancing Fracture Complexity," SPE 130043, 2010, 20 pages.
Stanchits et al., "Monitoring the Early Onset of Hydraulic Fracture Initiation by Acoustic Emission and Volumetric Deformation Measurements," ARMA 13-664, Jun. 2013, 9 pages.
Zoback et al., "Laboratory Hydraulic Fracturing Experiments in Intact and Pre-fractured Rock," Int. J. Rock Mech. Min. Sci. & Geomech, 1977, vol. 14, pp. 49-58.
International Search Report and Written Opinion from PCT/US2015/051592, dated May 27, 2016, 14 pages.

* cited by examiner

ENHANCING COMPLEX FRACTURE NETWORKS IN SUBTERRANEAN FORMATIONS

BACKGROUND

The embodiments herein relate generally to subterranean formation operations and, more particularly, to enhancing complex fracture networks in subterranean formations.

Hydrocarbon producing wells (e.g., oil producing wells, gas producing wells, and the like) are often stimulated by hydraulic fracturing treatments. In traditional hydraulic fracturing treatments, a treatment fluid, sometimes called a carrier fluid in cases where the treatment fluid carries particulates entrained therein, is pumped into a portion of a subterranean formation (which may also be referred to herein simply as a "formation") above a fracture gradient sufficient to break down the formation and create one or more fractures therein. The term "treatment fluid," as used herein, refers generally to any fluid that may be used in a subterranean application in conjunction with a desired function and/or for a desired purpose. The term "treatment fluid" does not imply any particular action by the fluid or any component thereof. As used herein, the term "fracture gradient" refers to a pressure (e.g., flow rate) necessary to create or enhance at least one fracture in a subterranean formation.

Typically, particulate solids are suspended in a portion of the treatment fluid and then deposited into the fractures. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces that act as conductive paths through which fluids produced from the formation may flow. As used herein, the term "proppant pack" refers to a collection of proppant particulates in a fracture, thereby forming a "propped fracture." The degree of success of a stimulation operation depends, at least in part, upon the ability of the proppant pack to permit the flow of fluids through the interconnected interstitial spaces between proppant particulates while maintaining open the fracture.

The complexity of a fracture network (or "network complexity") may be enhanced by stimulation operations to create new or enhance (e.g., elongate or widen) existing fractures, which may be interconnected. As used herein, the term "fracture network" refers to the access conduits, either natural or man-made or otherwise, within a subterranean formation that are in fluid communication with a wellbore. The "complexity" of a fracture network refers to the amount of access conduits, man-made or otherwise, within a subterranean formation that are in fluid communication with a wellbore; the greater the amount of access conduits, the greater the complexity. A fracture network with enhanced complexity may increase the amount of produced fluids that may be recovered from a particular subterranean formation.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
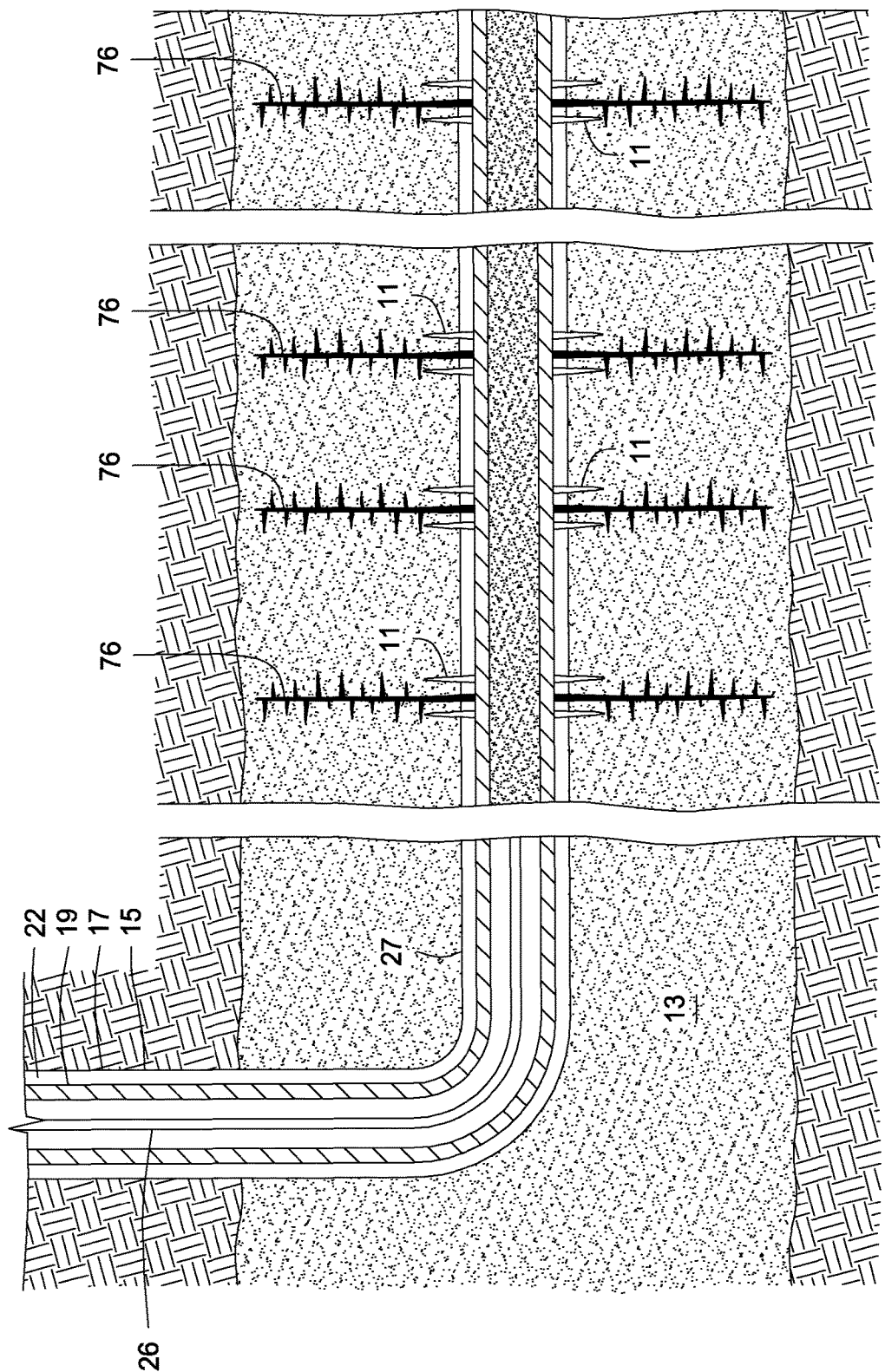
FIG. 1 is a cross-sectional side view of a multistage fracturing treatment operation occurring during the initial stages of pumping the alternatingly fluids described herein, according to one or more embodiments of the present disclosure.

The embodiments herein relate generally to subterranean formation operations and, more particularly, to enhancing complex fracture networks in subterranean formations.

Specifically, the embodiments of the present disclosure relate to increasing fracture network complexity within a subterranean formation in both the near-wellbore and far-field regions thereof using a plurality of fluid stages and diversion techniques. As used herein, the term "near-wellbore region," and grammatical variants thereof (e.g., "near-wellbore," and the like), refers to an annular volume of a subterranean formation penetrated by wellbore from the outer diameter of the wellbore extending radially inward along a main fracture from the wellbore and into the formation a distance of no greater than about 10 meters (33 feet). As used herein, the term "far-field region," and grammatical variants thereof (e.g., "far-field," and the like), refers to an annular volume of a subterranean formation penetrated by wellbore from the outer diameter of the wellbore extending radially inward along a main fracture beyond the near-wellbore region, or along a branch fracture. In some instances, the far-field region may be beyond the main fracture tip into the subterranean formation, the main fracture tip the portion of the main fracture that permits growth of the main fracture.

Advantages of the present disclosure include the use of a plurality of fluid stages that specifically allow creation or extension of a main fracture and branch fractures extending therefrom at one or both of the near-wellbore region and/or the far-field region of a main fracture, thereby enhancing fracture network complexity. As used herein, the term "main fracture," and grammatical variants thereof, refers to a primary fracture extending from a wellbore. A "branch fracture," and grammatical variants thereof (e.g., "branch," and the like) as used herein, refers to any fracture extending from a main fracture, or any non-primary fracture (e.g., a secondary fracture, a tertiary fracture, and the like) extending from a main fracture. Accordingly, a non-primary fracture that itself extends from a branch fracture is encompassed in the term "branch fracture." As used herein and with the embodiments of the present disclosure, the wellbore may be vertical, horizontal, or deviated (neither vertical, nor horizontal), without departing from the scope of the present disclosure.

The use of the plurality of fluids further allows at least partial separation of the formation of the main fracture and the formation of one or more branch fractures, such that the main fracture can continue to grow in length as branch fractures are created or extended therefrom. That is, the main fracture growth is not stunted due to leakoff in the non-length direction to form branch fractures using the methods described in the present disclosure. As used herein, the term "leakoff" refers to the tendency of fluid to be forced into a formation (e.g., due to a magnitude of pressure exerted on the formation such as during fluid introduction). Additionally, stress shadowing reduces the width of the main fracture, further encouraging growth thereof in length.

The embodiments herein additionally allow effective use of fluid volumes and proppant particulate amounts while forming a complex fracture network, such that costs associated with traditional fracturing operations may be reduced.

Multistage fracturing may also be utilized with the embodiments of the present disclosure to further enhance fracture complexity, and thus the hydrocarbons produced therefrom. As used herein, the term "multistage fracturing treatments," and grammatical variants thereof (e.g., "multistage fracturing," "multistage fracturing operations," and the like), refers to a subterranean formation operation in which a plurality of reservoir intervals, or a plurality of locations within one or more reservoir intervals, in the subterranean formation are stimulated in succession, including main and branch fractures. Examples of multistage fracturing treatments may include, but are not limited to, plug-and-perf operations, dissolvable plug-and-perf operations, continuous stimulation operations, and the like, and any combination thereof. For example, in some multistage fracturing treatments, a first fracture may be formed at a reservoir interval, followed by at least a second fracture formed at the same or a different reservoir interval in a subterranean formation. In some instances, multistage fracturing may involve fracturing a section of a reservoir interval, followed by plugging the fracture such that a treatment fluid may be diverted to a different location in the same reservoir interval or a different reservoir interval for forming a second fracture. The second fracture may then be plugged and the process repeated until the desired number of fractures are formed.

Accordingly, the embodiments of the present disclosure further permit creation of multiple main fractures within a single set of perforation clusters or slot clusters, which can further have branch fractures that may or may not interconnect in the near-wellbore or far-field regions to further enhance fracture network complexity. As used herein, the term "perforation," and grammatical variants thereof, refers to a communication tunnel into a subterranean formation through which oil or gas is produced into a wellbore. A perforation may be made in a wellbore itself, or through casing or liner, which may or may not be cemented. The term "slot," and grammatical variants thereof, as used herein, refers to a type of perforation that has a slot shape, such that it has a narrow opening (e.g., rectangular in shape, and the like).

Other subterranean formation operations that may utilize the embodiments described herein may include, but are not limited to, re-fracturing operations (e.g., to add newly optimized perforated zones and initiate dominate fracture geometry), remedial treatments, completion operations, and the like, without departing from the scope of the present disclosure.

As mentioned above, increasing fracture complexity in subterranean formations may increase the conductivity and productivity of the formation. Increasing fracture network complexity (e.g., keeping fractures, such as main fractures and branch fractures as described below, opened) greatly increases the surface area for the hydrocarbons (gas and/or oil) to desorb from the formation matrix, providing flow paths for these fluids to communicate with connected fractures and the wellbore for recovery.

In some embodiments, the complex fracture network enhancement methods and systems described herein may be utilized in traditional subterranean formations or in low-permeability subterranean formations, such as shale formations, tight-gas formations, and the like (collectively referred to simply as "subterranean formations" or "formations"). The permeability of a formation is a measure of the formation's resistance to through-flow fluid. Thus, low-permeability formations require considerable applied pressure in order to flow fluid through its pore spaces, as compared to formations having higher permeabilities. As used herein, the term "low-permeability formation," and grammatical variants thereof, refers to a formation that has a matrix permeability of less than 1,000 microdarcy (equivalent to 1 millidarcy). As used herein, the term "low-permeability formation" encompasses "ultra-low permeability formations," and grammatical variants thereof, which refers to a formation that has a matrix permeability of less than 1 microdarcy (equivalent to 0.001 millidarcy).

Examples of such low-permeability formations may include, but are not limited to, shale reservoirs and tight-gas sands. Shale reservoirs are sources of hydrocarbons comprising complex, heterogeneous rock with low permeability. Shale reservoirs may have permeabilities as low as less than about 0.001 millidarcy ("mD") ($9.869233 \times 10^{-19}$ m$^2$), and even as low as less than about 0.0001 mD ($9.869233 \times 10^{-20}$ m$^2$). An example of such a shale reservoir is the Eagle Ford Formation in South Texas, U.S.A., also having complex horizontal bedding planes representative of many shale reservoirs. Tight-gas sands are low permeability formations that produce mainly dry natural gas and may include tight-gas carbonates, tight-gas shales, coal-bed methane, tight sandstones, and the like. Tight-gas sands may have permeabilities as low as less than about 1 mD ($9.869233 \times 10^{-16}$ m$^2$), and even as low as less than about 0.01 mD ($9.869233 \times 10^{-18}$ m$^2$).

Some low-permeability formations, such as shale reservoirs, possess highly complex bedding planes that are representative of successive layers of stratified rock. These bedding planes present challenges to development of fracturing treatment designs that economically maximize the reservoir volume that may be stimulated for hydrocarbon recovery. These bedding planes may interfere with the formation of a smooth planar main fracture and associated horizontal and vertical complex fractures extending therefrom, all of which are often ignored in stimulation operations of such formations.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The use of directional terms such as above, below, upper, lower, upward, downward, left, right, uphole, downhole and the like are used in relation to the illustrative embodiments as they are depicted in the figures herein, the upward direction being toward the top of the corresponding figure and the downward direction being toward the bottom of the corresponding figure, the uphole direction being toward the surface of the well and the downhole direction being toward the toe of the well. Additionally, the embodiments depicted in the figures herein are not necessarily to scale and certain features are shown in schematic form only or are exaggerated or minimized in scale in the interest of clarity.

In some embodiments described herein, a plurality of fluid types are utilized, particularly with reference to viscosity, flow rate, and particulate content, to enhance fracture network complexity, which may additionally be used in formations having complex bedding planes, such as shale formations. Viscous fluids are used in the embodiments herein to induce fractures in the maximum stress direction of a formation, even if pre-existing fractures crossing the maximum stress direction exist. Such viscous fluids may additionally generate thick and planar main fractures with few branch fractures extending therefrom, whereas low-viscosity fluids (e.g., slickwater, linear gel, and the like) generate narrow, wavelike branch fractures. The viscous fluids cause minimal leakoff, such that main fractures may be formed and propagated efficiently without the creation of substantial branch fractures therefrom, thereby forming a thick and planar crack with a controlled length and thickness. That is, the amount and type of viscous fluid may be used to control the length and width of a main fracture in a formation. In contrast, low-viscosity fluids leakoff during their introduction into a formation, thus resulting in the thin, wavelike branch fractures described according to the embodiments described herein.

Accordingly, traditional use of low-viscosity fluids to create main fractures result in creation and propagation of secondary branch fractures that compete with the main fracture, thereby resulting in an overall decrease in the size, thickness, planarity, and length of the main fracture into the formation and thus potential decrease in productivity of the formation. Such main fractures may thus become pinched off or shortened prematurely without achieving desired size and length. Thus, while complex fracture network geometry is formed, it may be less than ideal or restricted in one or more ways. Accordingly, the formation of a primary main fracture with the desired, extended length that is not restricted facilitates the formation of complex fracture networks to interconnect generated near-wellbore and far-field secondary branch fractures to enhance hydrocarbon production.

In some embodiments, the present disclosure provides a method of method of alternatingly introducing a high-viscosity pad fluid comprising a first base fluid and a low-viscosity micro-proppant fluid comprising a second base fluid and micro-sized proppant particulates through a first opening at a first treatment interval in a wellbore in a subterranean formation. The high-viscosity pad fluid is proppant free and creates or extends at least a first main fracture, and the low-viscosity micro-proppant fluid creates or extends at least a first branch fracture extending from the first main fracture. Accordingly, a second or third or any number of additional branch fractures may be created or extended from the first main fracture according to the embodiments of the present disclosure.

In some embodiments, it may be preferred that the high-viscosity pad fluid and the low-viscosity micro-proppant fluid is substantially immiscible to further delineate the function of each fluid. As used herein, the term "substantially immiscible" refers to miscibility of fluids of no more than about 50%. Accordingly, the substantial immiscibility of the two fluids permits them to comingle, yet remain separated without forming a homogeneous mixture. By so preventing mixing, the high-viscosity pad fluid and the low-viscosity micro-proppant fluid to be injected alternatingly into a wellbore (and formation through an opening(s)) to generate the main fracture(s) and branch fracture(s) to form a complex fracture network, as described in greater detail below.

As used herein, the term "opening" encompasses perforations, slots, and clusters of perforations and/or slots, and any combination thereof. The micro-sized proppant particulates are then deposited into the first branch fracture (or more than one branch fracture, if formed) to prop open the branch fracture(s). The first branch fracture and any additional branch fractures formed may additionally be in the near-wellbore and/or far-field regions. In some embodiments, a plurality of branch fractures extend from a single main fracture covering a length of the main fracture in both the near-wellbore and far-field regions, as discussed in greater detail below.

The main fracture(s) may generally have a length in the range of from about 3 meters ("m") to about 300 m (equivalent to about 10 feet to about 1000 feet), encompassing any value and subset therebetween. For example, the main fracture(s) may have a length of about 3 m to about 60 m, or about 60 m to about 120 m, or about 120 m to about 180 m, or about 180 m to about 240 m, or about 240 m to about 300 m, encompassing any value and subset therebetween. The branch fracture(s) may generally have a length in the range of from about 0.03 m to about 50 m (equivalent to about 0.1 feet to about 164 feet), encompassing any value and subset therebetween. For example, the branch fracture (s) may have a length of about 0.03 m to about 1 m, or about 1 m to about 10 m, or about 10 m to about 20 m, or about 20 m to about 30 m, or about 30 m to about 40 m, or about 40 m to about 50 m, encompassing any value and subset therebetween. Each of these values is critical to the embodiments described herein and may depend on a number of factors including, but not limited to, the type of subterranean formation being stimulated, the pressure (e.g., pump pressure) of the fluids, the type of fluids fracturing the subterranean formation, and the like, and any combination thereof.

The fracture width or flow opening size of a main fracture is generally greater than the fracture width or flow opening size of a branch fracture. The main fractures and branch fractures described herein may be of any shape and may be formed by an ablation of any form that allows fluids to flow from the subterranean formation and into a wellbore, consistent with the descriptions provided herein.

As used herein, unless otherwise stated, the term "fracture" or "fractures" will refer collectively to both main fractures and branch fractures.

The pad fluid and micro-proppant fluids are of a high-viscosity and a low-viscosity respectively and in combination with their introduction alternatingly, form a complex fracture network. The viscosity of the high-viscosity pad fluids described herein may be in the range of from about 100 centipoise (cP) to about 20000 cP at a shear rate of 40 sec$^{-1}$ at room temperature, encompassing any value and subset therebetween. For example, the viscosity of the high-viscosity pad fluids may be in the range of about 100 cP to about 1000 cP, or about 1000 cP to about 4000 cP, or about 4000 cP to about 8000 cP, or about 8000 cP to about 12000 cP, or about 12000 cP to about 16000 cP, or about 16000 cP to about 20000 cP at a shear rate of 40 sec$^{-1}$ at room temperature, encompassing any value and subset therebetween. Each viscosity value for the high-viscosity pad fluid is critical to the embodiments of the present disclosure and may depend on a number of factors including, but not limited to, the type of base fluid used in the pad fluid, the type of subterranean formation being treated, the desired size and length of the main fracture to be created or extended, and the like, and any combination thereof. As used herein, the term "room temperature" means a temperature of from about 15° C. to about 25° C., encompassing any value and subset therebetween.

The low-viscosity of the micro-proppant fluid comprising the micro-sized proppant particulates, described in greater detail below, may have a viscosity in the range of from about 1 cP to about 200 cP at a shear rate of 40 sec$^{-1}$ at room temperature, encompassing any value and subset therebetween. For example, the low-viscosity of the micro-proppant fluid may be in the range of about 1 cP to about 40 cP, or about 40 cP to about 80 cP, or about 80 cP to about 120 cP, or about 120 cP to about 160 cP, or about 160 cP to about 200 cP at a shear rate of 40 sec$^{-1}$ at room temperature, encompassing any value and subset therebetween. Each viscosity value for the low-viscosity micro-proppant fluid is critical to the embodiments of the present disclosure and may depend on a number of factors including, but not limited to, the type of base fluid used in the micro-proppant fluid, the type of subterranean formation being treated, the desired size and length of the branch fracture(s) to be created or extended, and the like, and any combination thereof.

In addition to utilizing the high-viscosity pad fluid for forming the main fracture(s) and the low-viscosity micro-proppant fluid for forming the branch fracture(s), the embodiments described herein additionally utilize "alternatingly" introduction of the two fluids to enhance fracture network complexity. As used herein, the term "alternatingly," and grammatical variants thereof (e.g., "alternatingly introduced," "alternating," and the like), means that a volume of the high-viscosity pad fluid is introduced, a volume of the low-viscosity micro-proppant fluid is introduced, and thereafter repeated in any order. Accordingly, neither of the two fluids is introduced simultaneously. The term "alternatingly" does not imply that the same volume of both the high-viscosity pad fluid and the low-viscosity micro-proppant fluid are introduced or that the volume of either fluid is kept consistent throughout a treatment operation. That is, a large volume of high-viscosity pad fluid compared to the low-viscosity micro-proppant fluid may be introduced consistently over time, or the amount of high-viscosity pad fluid may reduce or increase over time relative to itself or the low-viscosity micro-proppant fluid, or the amount of low-viscosity micro-proppant fluid may reduce or increase over time relative to itself or the high-viscosity pad fluid, without departing from the scope of the present disclosure.

It may be preferred to introduce the high-viscosity pad fluid first, as it is used to create or extend at least the first main fracture and the low-viscosity micro-proppant fluid is used to create or extend at least the first branch fracture extending from the first main fracture. The high-viscosity pad fluid allows the low-viscosity micro-proppant fluid to take advantage of the pressure build-up created in the main fracture by the high-viscosity fluid. The low-viscosity micro-proppant fluid is then able to take advantage of pressure-dependent leakoff, where it dissipates the fluid energy stored by the high-viscosity fluid to generate branch fractures (and thus a complex fracture network) along the axis of the primary fracture. The low-viscosity micro-proppant fluid creates or enhances generation of natural fractures or new branch fractures and the micro-proppant serves to ensure that these branch fractures remain open for hydrocarbons to desorb and drain into the main fracture for production.

The high-viscosity pad fluid and the low-viscosity micro-proppant fluid may be introduced at a first flow rate designed to create or extend the main fracture when the pad fluid is entering the opening into the formation from the wellbore and the branch fracture when the micro-proppant fluid is entering the opening into the formation from the wellbore. In some embodiments, the first flow rate may be in the range of from about 0.79 cubic meters per minute (m$^3$/min) to about 15.9 m$^3$/min (equivalent to about 5 barrels per minute (bpm) to about 100 bpm, where a bpm is equal to 0.159 m$^3$/min), encompassing any value and subset therebetween. For example, the first flow rate may be from about 0.79 m$^3$/min to about 3.79 m$^3$/min, or about 3.79 m$^3$/min to about 6.79 m$^3$/min, or about 6.79 m$^3$/min to about 9.79 m$^3$/min, or about 9.79 m$^3$/min to about 12.79 m$^3$/min, or about 12.79 m$^3$/min to about 15.9 m$^3$/min, encompassing any value and subset therebetween. Each of these values is critical to the embodiments herein and may depend on a number of factors including, but not limited to, the viscosity of the high-viscosity pad fluid and the low-viscosity micro-proppant fluid, the type of subterranean formation, the desired fracture network complexity, the fracture gradient of the subterranean formation, and the like, and any combination thereof.

Referring now to FIG. 1, illustrated is a cross-sectional side view of a multistage fracturing treatment operation 30 occurring during the initial stages of pumping the alternatingly fluids of the present disclosure. As depicted, a tool string 26 is deployed within wellbore 15. Wellbore 15 has a substantially vertical portion 17 and a substantially horizontal portion 27 that extends through a hydrocarbon-bearing subterranean formation 13. A casing string 19 is secured within the wellbore 15 by cement 22. As discussed in greater detail below, the wellbore 15 need not be vertical or horizontal, but may be either or deviated, without departing from the scope of the present disclosure. Additionally, the wellbore 15 may be open hole or comprise a casing string 19 that is or is not cemented with cement 22, without departing from the scope of the present disclosure.

Tool string 26 is used to introduce a penetrating tool (not shown, such as a perforating tool that is positioned at an area of interest (i.e., a target interval) and is detonated to generate openings 11 (e.g., perforation tunnels) at one or more locations through the wellbore 15 and into the formation 13. As shown, openings 11 at four different target intervals have been created, but it will be appreciated that any number of target intervals and any number of openings 11 may be created along the length of the wellbore 15 to recover hydrocarbons from the formation 13. Thereafter, fractures 76 are created having a main fracture and branch fractures in accordance with the embodiments of the present disclosure by alternatively introducing the high-viscosity pad fluid and the low-viscosity micro-proppant fluid as described herein and as depicted in FIGS. 2a, 2b and 3 below.

Figure 2A:
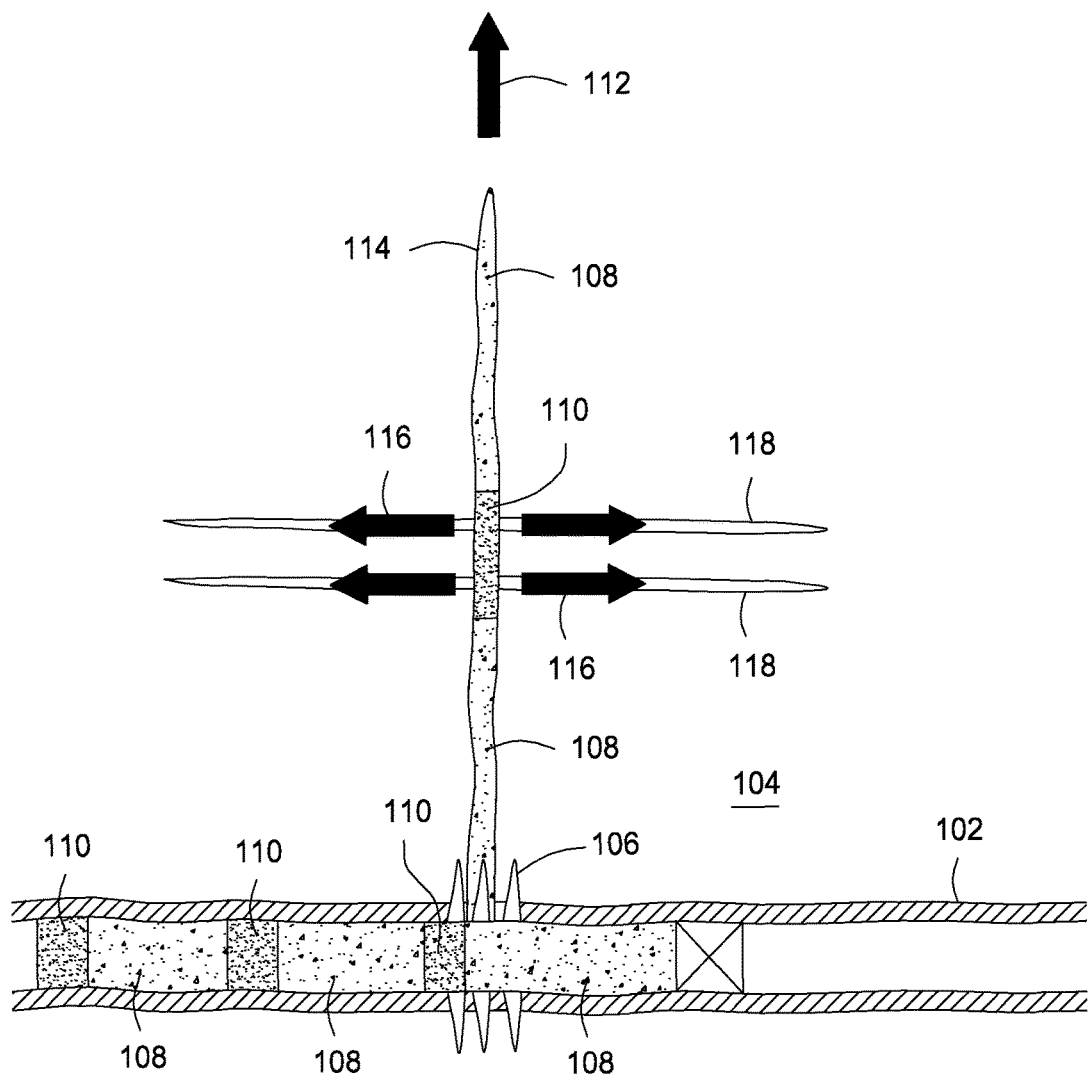
FIG. 2a is a cross-sectional side view of the effect of a high-viscosity pad fluid and low-viscosity micro-proppant fluid being initially alternatingly introduced into a formation to stimulate a complex fracture network, according to one or more embodiments of the present disclosure.
Figure 2B:
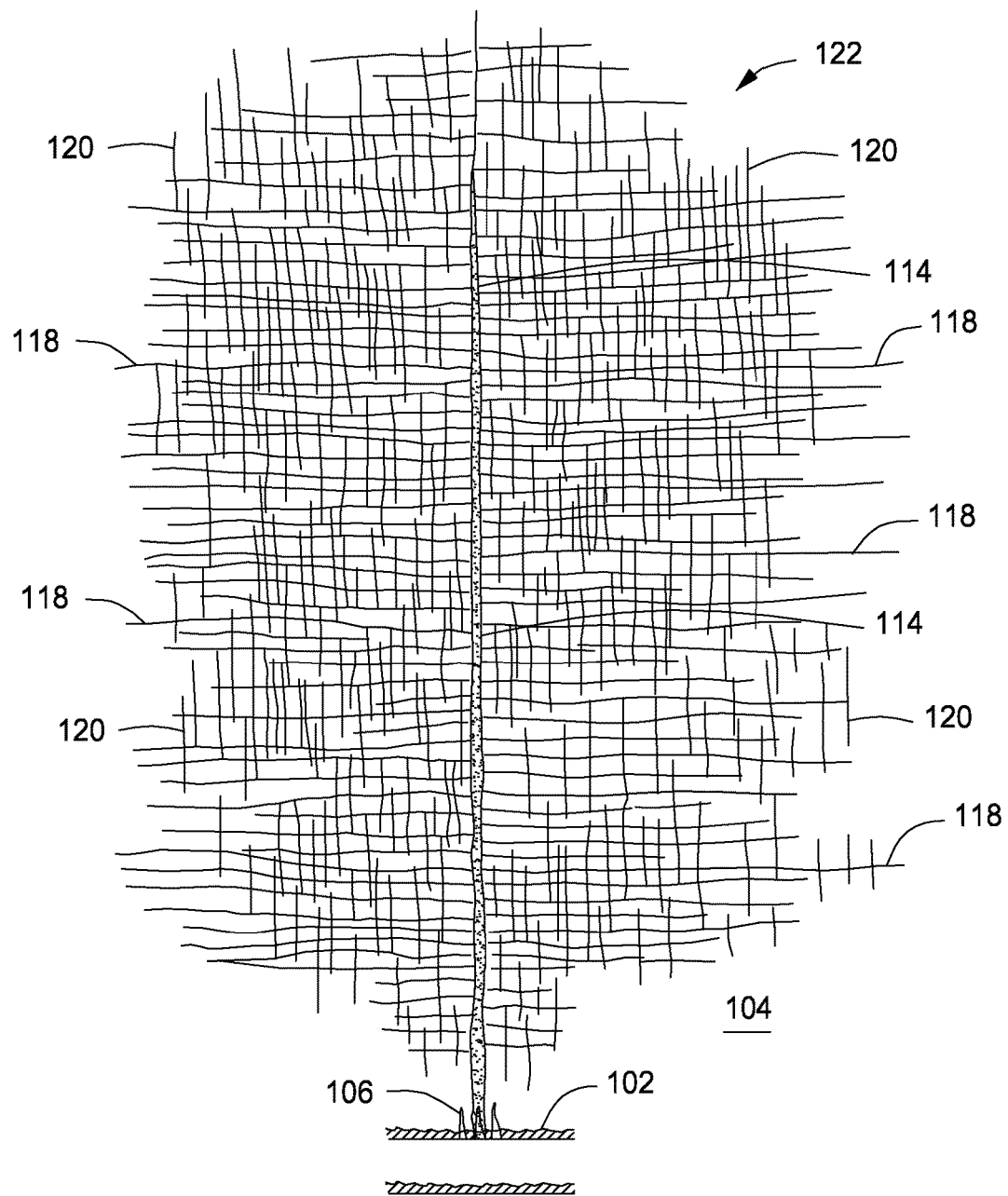
FIG. 2b is a cross-sectional side view of the effect of a high-viscosity pad fluid and low-viscosity micro-proppant fluid being alternatingly introduced over a period of time into a formation to form a complex fracture network, according to one or more embodiments of the present disclosure.
Figure 3:
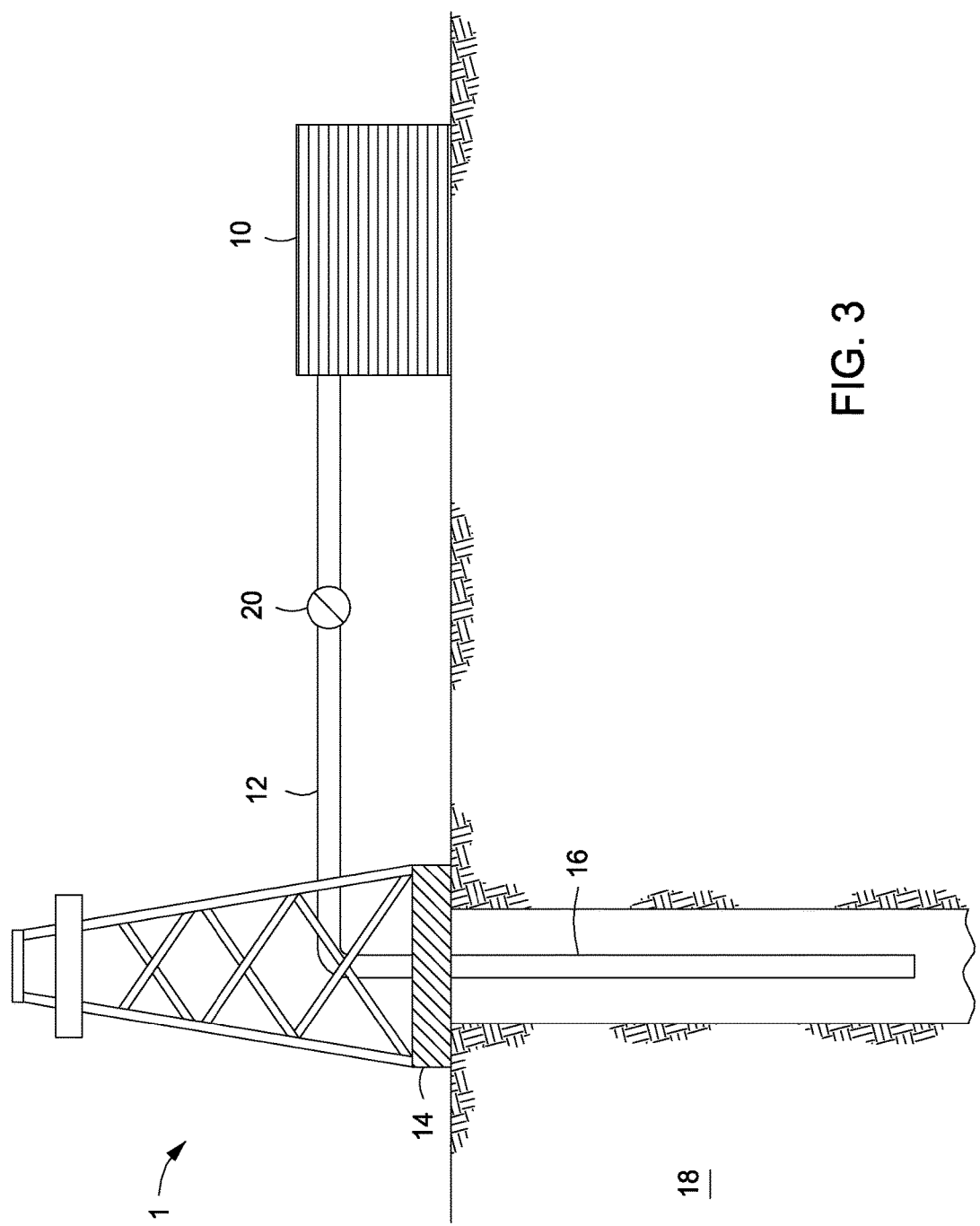
FIG. 3 depicts an embodiment of a system configured for delivering various fluids of the embodiments described herein to a downhole location, according to one or more embodiments of the present disclosure.

Referring now to FIG. 2a, illustrated is a cross-sectional side view of the effect of a high-viscosity pad fluid and low-viscosity micro-proppant fluid being initially alternatingly introduced into a formation to stimulate a complex fracture network, as explained above. As shown in FIG. 2a, a horizontal wellbore 102 is formed in a subterranean formation 104. It will be appreciated that although a horizontal wellbore 102 is depicted in FIG. 2a, vertical or deviated wellbores may additionally be used in accordance with the methods of the present disclosure. Moreover, the wellbore 102 may be openhole, cased, or cased with cement at any or all portions, without departing from the scope of the present disclosure. A cluster of flow openings 106 are formed in through the wellbore and into the wellbore. As shown, six openings are shown about the circumference of the wellbore 102, however, it will be appreciated that any number of openings 106, including a first opening and any multiple additional openings may be formed, without departing from the scope of the present disclosure. Generally, the number of openings is between about 1 and about 12, encompassing any value and subset therebetween. For example, the number of openings may be about 1, 2, 3, 4, 5, 6, 7, 8, 9, 10, 11, or 12, encompassing any value and subset therebetween.

As shown, a high-viscosity pad fluid 108 first introduced into the wellbore 102 alternatingly with a low-viscosity micro-proppant fluid 110. Each of the fluids is introduced into the formation 104 through the openings 106. Although as depicted only 3 of the openings 106 are receiving the high-viscosity pad fluid 108 and the low-viscosity micro-proppant fluid 110, it will be appreciated that any number of openings 106 would receive the fluids absent a diversion operation operating to direct the fluids away from particular openings 106. Accordingly, that only 3 of the openings 106 are depicted as receiving the high-viscosity pad fluid 108 and the low-viscosity micro-proppant fluid 110 is for illustration purposes only. Due to fluid mechanics, and as described above, the high-viscosity pad fluid flows in a direction 112 to create or enhance a thick, planar main fracture 114. The high-viscosity pad fluid resists leakoff from the main fracture 114 and thus efficiently propagates the main fracture 114. Such a main fracture 114 may be propagated perpendicularly through horizontal complex bedding planes, such as when the formation 104 is an unconventional reservoir such as shale.

Simultaneously, as the low-viscosity micro-proppant fluid 110 is introduced into the openings 106 and into the main fracture 114, the low-viscosity qualities of the low-viscosity micro-proppant fluid 110 encourages leakoff into the surrounding formation 104 from the main fracture 114 in a direction substantially perpendicular to the main fracture 114 in the direction of arrows 116. The low-viscosity micro-proppant fluid 110 thus produces thin (or relatively narrower compared to the main fracture 114) branch fractures 118. Although four branch fractures 118 are shown, any number of additional branch fractures 118 may be initially formed off the main fracture 114 at any location along the length of the main fracture 114 during early stage alternating introduction of the fluids described herein, without departing from the scope of the present disclosure. Moreover, more than one main fracture 114 may be initially formed through the openings (e.g., substantially parallel main fractures), without departing from the scope of the present disclosure.

As shown in FIG. 2a, the volume of high-viscosity pad fluid 108 alternatingly introduced is greater compared to the low-viscosity micro-proppant fluid 110. That is, each alternatingly amount of high-viscosity pad fluid 108 is greater in volume than each alternatingly introduced low-viscosity micro-proppant fluid 110. It will be appreciated, however, as discussed previously, that the volumes of the high-viscosity pad fluid 108 and the low-viscosity micro-proppant fluid 110 relative to each other may vary such that either volume is higher than the other, without departing from the scope of the present disclosure. In some embodiments, the volume of each alternatingly introduced high-viscosity pad fluid 108 compared to the volume of the subsequent or previous alternatingly introduced low-viscosity micro-proppant fluid 110 may be in the range of from about 10:1 to about 0.1:1, encompassing any value and subset therebetween. For example, the range may be from about 10:1 to about 8:1, or about 8:1 to about 6:1, or about 6:1 to about 4:1, or about 4:1 to about 2:1, or about 2:1 to about 0.1:1, encompassing any value and subset therebetween.

Referring now to FIG. 2b, with continued reference to FIG. 2a, illustrated is a cross-sectional side view of the effect of a high-viscosity pad fluid and low-viscosity micro-proppant fluid being alternatingly introduced over a period of time into a formation to form a complex fracture network and as explained above. Accordingly, FIG. 2a represents initial creation of a complex fracture and FIG. 2b illustrates a complex fracture network 122 that has been formed, although additional complexity may be introduced or the complexity may be desirably less such that the amount of fluids introduced does not create the complexity shown, without departing from the scope of the present disclosure. As shown, the main fracture 114 is formed with multiple branch fractures 114 extending substantially perpendicularly therefrom. As the low-viscosity micro-proppant fluid leaksoff and creates or extends the multiple branch fractures 114, it continues to leakoff from the branch fractures 118, thereby forming multiple secondary branch fractures 120 from the primary branch fractures 118. Accordingly, a complex fracture network 122 is formed with increased surface area for the production and recovery of hydrocarbon fluids. The complex fracture network 122 encompasses both the near-wellbore and far-field regions within the formation 104. During the formation of the branch fractures 118, the micro-proppant is placed within the branch fractures 118 to prop them open (i.e., forming at least a partial monolayer of proppant) and maintain them open during hydrocarbon production of the formation 104. As defined herein, the term "partial monolayer" refers to a type of proppant pack in which micro-proppant are capable of holding a fracture open, wherein the separation between any one point of the fracture faces may be less than, or about the same, as the largest exterior dimension of any one of the micro-proppant. Accordingly, in some embodiments, only a partial monolayer of micro-proppant is formed in the branch fractures 118, and the at least partial monolayer serves to maintain open the branch fractures 118. However, at least a partial multilayer of the micro-proppant may also be formed in the branch fractures 118, serving to maintain open the branch fractures 118, without departing from the scope of the present disclosure. As used herein, the term "partial multilayer" refers to a type of proppant pack in which micro-proppant are capable of holding a fracture open, wherein the separation between any one point of the fracture faces may be more than the largest exterior dimension of any one of the particulates. In a partial monolayer and/or partial multilayer, the micro-proppant may be spaced closely or widely apart in the branch fractures 118.

After the desired fracture complexity has been achieved within a particular subterranean formation using the alternatingly introduced high-viscosity pad fluid and low-viscosity micro-proppant fluid, a low-viscosity macro-proppant fluid comprising a third base fluid and macro-sized proppant particulates are introduced into the wellbore through the at least first opening. The low-viscosity macro-proppant fluid is introduced at a second flow rate designed to place the macro-sized proppant particulates into the main fracture, which may or may not further create or extend additional fracture complexity. Accordingly, the macro-sized proppant particulates are placed within the main fracture to prop open (i.e., form a proppant pack in) the main fracture and keep it open for hydrocarbon flow during production of the formation.

The low-viscosity of the macro-proppant fluid comprising the macro-sized proppant particulates, described in greater detail below, may have a viscosity in the range of from about 1 cP to about 200 cP at a shear rate of 40 $sec^{-1}$ at room temperature, encompassing any value and subset therebetween. For example, the low-viscosity of the macro-proppant fluid may be in the range of about 1 cP to about 40 cP, or about 40 cP to about 80 cP, or about 80 cP to about 120 cP, or about 120 cP to about 160 cP, or about 160 cP to about 200 cP at a shear rate of 40 $sec^{-1}$ at room temperature, encompassing any value and subset therebetween. Each viscosity value for the low-viscosity macro-proppant fluid is critical to the embodiments of the present disclosure and may depend on a number of factors including, but not limited to, the type of base fluid used in the macro-proppant fluid, the type of subterranean formation being treated, the flow rate selected for introducing the low-viscosity macro-proppant fluid, and the like, and any combination thereof.

In some embodiments, the second flow rate may be in the range of from about 0.79 cubic meters per minute ($m^3$/min) to about 15.59 $m^3$/min (equivalent to about 5 barrels per minute (bpm) to about 100 bpm, where a bpm is equal to 0.159 $m^3$/min), encompassing any value and subset therebetween. For example, the second flow rate may be from about 0.79 $m^3$/min to about 3.79 $m^3$/min, or about 3.79 $m^3$/min to about 6.79 $m^3$/min, or about 6.79 $m^3$/min to about 9.79 $m^3$/min, or about 9.79 $m^3$/min to about 12.79 $m^3$/min, or about 12.79 $m^3$/min to about 15.9 $m^3$/min, encompassing any value and subset therebetween. Each of these values is critical to the embodiments herein and may depend on a number of factors including, but not limited to, the first flow rate of the high-viscosity pad fluid and the low-viscosity micro-proppant fluid, the type of subterranean formation, the desired fracture network complexity, the fracture gradient of the subterranean formation, the amount of micro-sized proppant particulates (e.g., whether it is believed that the micro-sized proppant particulates have fully packed the branch fractures, if such is desired), and the like, and any combination thereof. For example, in some embodiments, the second flow rate may be desirably less than the first flow rate, such that additional fracture complexity is not created or extended by introduction of the low-viscosity macro-proppant fluid. On the other hand, it may be desirable to induce leakoff into the branch fractures to pack even the larger macro-sized proppant particulates into the branch fractures among and around the micro-sized proppant particulates, which may warrant an elevated second flow rate which still may be less than the first flow rate, or equal to or greater than the first flow rate.

After propping both the branch fractures with the micro-sized proppant particulates and the main fracture with the macro-sized proppant particulates, a low-viscosity near-wellbore diversion fluid comprising a fourth base fluid and a degradable diversion agent may be introduced into the wellbore through the first opening. The low-viscosity of the near-wellbore diversion fluid aids in placing the degradable diversion material into the target area to form a tight seal, which is far more efficient than if the degradable diversion agent was delivered in a high-viscosity fluid. The degradable diversion agents are placed within the mouth of the first opening to form a fluidic seal between the wellbore and through the first opening. In other embodiments, prior to propping the main fraction with the macro-sized proppant particulates, a low-viscosity far-field diversion fluid comprising a fifth base fluid and a degradable diversion agent is introduced into the wellbore through the first opening and the degradable diversion agent is placed into the mouth of a first branch fracture so as to form a fluidic seal between the main fracture and the through the first branch fracture. That is, the diversion fluids described herein may divert fluids in the near-wellbore region or the far-field region, and such diversion may depend, at least in part, on the size of the degradable diversion agent(s), the order of placement of the low-viscosity macro-proppant fluid and the low-viscosity diversion fluid, and the like, and any combination thereof.

As used herein, the term "mouth" with reference to an opening through a wellbore and into a subterranean formation (e.g., the first opening), refers to a portion of the opening beginning at the wellbore and extending into the subterranean formation not to exceed the near-wellbore region, as defined above. As used herein, the term "mouth" with reference to a branch fracture refers to a portion of the branch fracture beginning at a main fracture and extending into the branch fracture no more than about 91.44 centimeters (cm) (about 36 inches (in)), or in some embodiments about 15.24 cm to about 91.44 cm (about 6 in to about 36 in). As used herein, the term "fluidically seal," and grammatical variants thereof (e.g., "fluidically sealing," "fluidic seal," and the like), refers to a barrier that is capable of blocking fluid flow such that permeability of the barrier is no more than about 0.01 millidarcies (md) under natural conditions in a subterranean formation or during a subterranean formation operation (e.g., during a multistage fracturing operation as described herein).

In some embodiments, the fluidic seal is formed at the mouth of an opening(s) at a location of less than about 1 meter into the subterranean formation from the wellbore. In other embodiments, the fluidic seal is formed at a location of no more than about 10 inches from the wellbore. That is, the fluidic seal may be formed at any point in the near wellbore region from the face of the wellbore and up to 1 meter extended radially into the formation from the wellbore, encompassing any value and subset therebetween. Each of these values is critical to the embodiments of the present disclosure and may depend on a number of factors including, but not limited to, the size and shape of the opening(s), the size and shape of the degradable diversion agent(s), and the like, and any combination thereof.

The low-viscosity of the diversion fluids (collectively including both the "near-wellbore low-viscosity diversion fluid" and the "far-field low-viscosity diversion fluid") described herein comprising the degradable diversion particulates, described in greater detail below, may have a viscosity in the range of from about 1 cP to about 200 cP at a shear rate of 40 $sec^{-1}$ at room temperature, encompassing any value and subset therebetween. For example, the low-viscosity of the near-wellbore low-viscosity diversion fluid may be in the range of about 1 cP to about 40 cP, or about 40 cP to about 80 cP, or about 80 cP to about 120 cP, or about 120 cP to about 160 cP, or about 160 cP to about 200 cP at a shear rate of 40 $sec^{-1}$ at room temperature, encompassing any value and subset therebetween. Each viscosity value for the low-viscosity diversion fluid is critical to the embodiments of the present disclosure and may depend on a number of factors including, but not limited to, the type of base fluid used in the diversion fluid, the type of subterranean formation being treated, and the like, and any combination thereof.

In some embodiments, the first opening may be a cluster of perforations and slots and the steps described above involving alternatingly introducing the high-viscosity pad fluid and the low-viscosity micro-sized proppant particulates at the first flow rate, followed by introducing the low-viscosity macro-sized proppant particulates at the second flow rate may be repeated at at least two of the perforations or slots, thereby forming at least a second main fracture and a second branch fracture extending therefrom within the same treatment interval as the first main fracture and first branch fracture, may be performed prior to introducing the low-viscosity diversion fluid. Accordingly, the low-viscosity diversion fluid is used to form a fluidic seal in the mouth of the at least two perforations or slots through which complex fracturing has occurred.

In other embodiments, the fluidic seal is first formed at the first opening, which may be a single opening or at least two perforations or slots in a cluster opening. Upon formation of the fluidic seal with the degradable diversion agent between the wellbore and the first opening, the steps described above involving alternatingly introducing the high-viscosity pad fluid and the low-viscosity micro-sized proppant particulates at the first flow rate, followed by introducing the low-viscosity macro-sized proppant particulates at the second flow rate may be repeated at either a second opening or at least a second or third perforation or slot in a cluster opening at the same or different treatment interval, thereby forming at least another main fracture and branch fracture (e.g., a second or greater main fracture and a second or greater branch fracture).

That is, the low-viscosity diversion fluid may be introduced to form a fluidic seal at one or more openings or one or more perforations or slots within an opening before or after forming multiple main fractures and branch fractures within a single treatment interval or multiple treatment intervals, without departing from the scope of the present disclosure. Generally, during multistage fracturing operations, wellbore isolation devices are used to zonally isolate treatment intervals of interest and, accordingly, a single interval may be treated to form the propped complex fracture network, followed by introduction of the low-viscosity diversion fluid to form fluidic seal(s) in the one or more openings or openings represented by clusters. Thereafter, another treatment interval is isolated and the steps of forming a propped complex fracture network and formation of fluidic seal(s) is repeated at a second treatment zone having one or more openings or openings represented by clusters. It will be appreciated that the flow rates for the fluids may be the same or different as those used for the first fluids and formation of the first main fracture and first branch fracture. Accordingly, the present disclosure provides for creation of complex fracture networks in multiple locations (i.e., through multiple openings or an opening represented by a cluster of perforations or slots) within the same treatment interval in a formation, within different treatment intervals, or any combination thereof, without departing from the scope of the present disclosure.

In some embodiments, when greater than one main fracture and branch fracture is formed within the same or different treatment intervals into the subterranean formation, as described herein, such complex fractures may interconnect at one or both of a near-wellbore region(s) and/or a far-field region(s) of the subterranean formation, thereby increasing fracture network complexity. As used herein, the term "interconnected," and grammatical variants thereof (e.g., "interconnection," and the like), refers fractures (i.e., main and branch fractures) that are in fluid communication, regardless of fluid flow permeability. In some instances, the propped main or branch fractures described herein may be interconnected in the near-wellbore region at a location in the range of from about 1.5 meters (m) to about 10 m into the formation from the wellbore (or about 5 feet to about 33 feet), encompassing any value and subset therebetween. In other embodiments, the propped main or branch fractures described herein may be interconnected in the far-field wellbore region at a location in the range of from about 11 m to about 300 m into the formation from the wellbore (about 36 feet to about 984.3 feet), encompassing any value and subset therebetween. Each of these values is critical to the embodiments of the present disclosure and may depend on a number of factors including, but not limited to, the size and shape of the propped main fractures, the size and shape of the propped branch fractures, the pressure of the introduced various treatment fluids, and the like, and any combination thereof.

The fluidic seal(s) formed with the degradable diversion agent(s) may degrade over time or in response to a particular stimulant (e.g., temperature, pressure, salinity, and the like), as discussed in greater detail below. Degradation of the degradable diversion agent(s) removes at least a portion of the fluidic seal, thereby allowing fluid flow between the wellbore and the relevant opening(s). As used herein, the term "removing at least a portion of the fluidic seal," and grammatical variants thereof, means restore fluid flow permeability through a fluidic seal described herein by at least 0.01 darcies.

The base fluids for forming the high-viscosity pad fluid, the low-viscosity micro-proppant fluid, the low-viscosity macro-proppant fluid, and the low-viscosity diversion fluid (e.g., the first, second, third, fourth, and fifth base fluids), whether used initially or after repeating one or more steps herein (e.g., at least a second high-viscosity pad fluid, at least a second low-viscosity micro-proppant fluid, at least a second low-viscosity macro-proppant fluid, and at least a second low-viscosity), may be any fluid suitable for use in a subterranean formation. Collectively, these fluids are referred to herein as "treatment fluids," and examples of suitable base fluids for use in the treatment fluids may include, but are not limited to, an aqueous base fluid, an aqueous miscible base fluid, an oil base fluid, a water-in-oil emulsion, an oil-in-water emulsion, a viscoelastic surfactant base fluid, and any combination thereof.

Aqueous base fluids suitable for use in the treatment fluids described herein may include, but are not limited to, fresh water, saltwater (e.g., water containing one or more salts dissolved therein), brine (e.g., saturated salt water), seawater, produced water (e.g., water produced as a byproduct from a subterranean formation during hydrocarbon production), waste water (e.g., water that has been adversely affected in quality by anthropogenic influence) that is untreated or treated, and any combination thereof. Generally, the water may be from any source, provided that it does not contain components that might adversely affect the stability and/or performance of the treatment fluids. Suitable aqueous-miscible fluids may, in some embodiments, include, but not be limited to, an alcohol (e.g., methanol, ethanol, n-propanol, isopropanol, n-butanol, sec-butanol, isobutanol, and t-butanol), a glycerin, a glycol (e.g., polyglycols, propylene glycol, and ethylene glycol), a polyglycol amine, a polyol, any derivative thereof, any in combination with a salt (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous base fluid described above, and any combination thereof.

Suitable oil-based fluids may include, but are not limited to, an alkane, an olefin, an aromatic organic compound, a cyclic alkane, a paraffin, a diesel fluid, a mineral oil, a desulfurized hydrogenated kerosene, and any combination thereof. Suitable water-in-oil emulsions, also known as invert emulsions, may have an oil-to-water ratio of from a greater than about 50:50, to less than about 100:0, encompassing any value and subset therebetween. Suitable oil-in-water emulsions may have a water-to-oil ratio of from a greater than about 50:50, to less than about 100:0, encompassing any value and subset therebetween. It should be noted that for water-in-oil and oil-in-water emulsions, any mixture of the above may be used including the water being and/or comprising an aqueous-miscible fluid.

Viscoelastic surfactant fluids for use as the base fluids described herein may include, but are not limited to those that are cationic, anionic, or amphoteric in nature. Suitable examples of viscoelastic surfactant fluids may include, but are not limited to, a methyl ester sulfonate, a hydrolyzed keratin, a taurate, an amine oxide, an ethoxylated amide, an alkoxylated fatty acid, an alkoxylated alcohol, an ethoxylated fatty amine, an ethoxylated alkyl amine, and any combination thereof.

In some embodiments, the treatment fluids for use in conjunction with the embodiments of the present disclosure may be foamed. As used herein the term "foam," and grammatical variants thereof, refers to a two-phase composition having a continuous liquid phase and a discontinuous gas phase. In some embodiments, treatment fluids for use in conjunction with the embodiments of the present disclosure may comprise a base fluid, a gas, and a foaming agent.

Suitable gases for use in the foamed treatment fluids may include, but are not limited to, nitrogen, carbon dioxide, air, methane, helium, argon, and any combination thereof. One skilled in the art, with the benefit of this disclosure, should understand the benefit of each gas. By way of non-limiting example, carbon dioxide foams may have deeper well capability than nitrogen foams because carbon dioxide foams have greater density than nitrogen gas foams, which may be preferred for use in the high-viscosity pad fluids described herein, although carbon dioxide foams may additionally be used for any of the low-viscosity treatment fluids described herein, provided that the viscosity requirements for each fluid is satisfied.

In some embodiments, the quality of the foamed treatment fluids may range from about 5% to about 95% gas volume, encompassing any value and subset therebetween. Most preferably, the foamed treatment fluid may have a foam quality from about 85% to about 95%, or about 90% to about 95%, encompassing any value and subset therebetween.

Suitable foaming agents may include, but are not limited to, cationic foaming agents, anionic foaming agents, amphoteric foaming agents, nonionic foaming agents, and any combination thereof. Examples of suitable foaming agents may include, but are not limited to, surfactants like betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, and any combination thereof. Foaming agents may be included in foamed treatment fluids at concentrations ranging typically from about 0.05% to about 2% by weight of the liquid component of the treatment fluid (e.g., from about 0.5 to about 20 gallons per 1000 gallons of liquid), encompassing any value and subset therebetween.

The high-viscosity and/or low-viscosity treatment fluids described herein may comprise a gelling agent to obtain the desired viscosity for each treatment fluid, as described above. Suitable gelling agents may include, but are not limited to, a natural polymer, a synthetic polymer, and any combination thereof. Oligomers, including those listed herein, capable of associating to form higher viscosity networks may also be used as the gelling agents, without departing from the scope of the present disclosure.

Suitable gelling agents may include, but are not limited to, polysaccharides, biopolymers, and/or derivatives thereof that contain one or more of these monosaccharide units: galactose, amylose, mannose, glucoside, glycosaminoglycan, glucose, xylose, arabinose, fructose, glucuronic acid, pyranosyl sulfate, and any combination thereof. Specific examples of suitable polysaccharides may include, but are not limited to, a guar gum (e.g., hydroxyethyl guar, hydroxypropyl guar, carboxymethyl guar, carboxymethylhydroxyethyl guar, carboxymethylhydroxypropyl guar, and the like), a cellulose derivative (e.g., hydroxyethyl cellulose, carboxyethylcellulose, carboxymethylcellulose, carboxymethylhydroxyethylcellulose, and the like), xanthan, scleroglucan, succinoglycan, diutan, and any combination thereof.

Examples of suitable synthetic polymers may include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamide and methacrylamidoalkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, any derivatives thereof, and any combination thereof.

In certain embodiments, the gelling agent may comprise an acrylamide/2-(methacryloyloxy)ethyltrimethylammonium methyl sulfate copolymer. In other certain embodiments, the gelling agent may comprise an acrylamide/2-(methacryloyloxy)ethyltrimethylammonium chloride copolymer. In yet other embodiments, the gelling agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the treatment fluids described herein in an amount of from about 0.001% to about 0.5% by weight per volume (wt/vol) of the base fluid, encompassing any value and subset therebetween. For example, the gelling agent may be present in an amount of from about 0.001% to about 0.01%, or about 0.01% to about 0.1%, or about 0.1% to about 0.2%, or about 0.2% to about 0.3%, or about 0.3% to about 0.4%, or about 0.4% to about 0.5% wt/vol of the base fluid, encompassing any value and subset therebetween. Each of these values is critical to the performance of the methods described herein, where amount of gelling agent may be dependent on the type of the desired viscosity of the treatment fluid (e.g., whether it is a high-viscosity or low-viscosity treatment fluid), the selected base fluid, the type of subterranean formation, and the like, and any combination thereof.

In some embodiments, it may be desirable to crosslink the gelling agent(s) in the treatment fluids to further increase the viscosity thereof. Inclusion of crosslinking agents can achieve the increased viscosity due to crosslinking. When included in a treatment fluid, the crosslinking agents may include, but are not limited to, a borate ion, a metal ion, or similar component that is capable of crosslinking at least two molecules of the gelling agent. Examples of suitable crosslinking agents may include, but are not limited to, borate ions, magnesium ions, zirconium IV ions, titanium IV ions, aluminum ions, antimony ions, chromium ions, iron ions, copper ions, magnesium ions, zinc ions, and any combination thereof. These ions may be provided by providing any compound that is capable of producing one or more of these ions.

In some embodiments, the crosslinking agent may be a multifunctional boronic acid crosslinking agent comprising a copolymer that comprises at least one boronic acid monomer unit and at least one water-soluble monomer unit. The multifunctional boronic acid crosslinking agent may be a random copolymer. The at least one boronic acid monomer unit may be a polymerizable vinyl, allyl, or acrylic functional group; an aryl, alkyl, alkenyl, or alkynyl boronic acid; and any combination thereof. The at least one water-soluble monomer unit may be selected from the group consisting of an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide, an alkyl dimethylammoniumethyl methacrylate halide, an alkyl dimethylammoniumpropyl methacrylamide halide, any derivative thereof, and any combination thereof. For example, the boronic acid monomer unit may be 3-acrylamidophenyl boronic acid and the water-soluble monomer unit may be an acrylamide (e.g., N,N-dimethylacrylamide). In some embodiments, the ratio of the boronic acid monomer unit(s) to the water-soluble monomer unit(s) is in the range of from about 1:1 to about 1:200, encompassing any value and subset therebetween.

In certain embodiments, the crosslinking agent may be formulated to remain inactive until it is "activated" by, among other things, certain conditions in the treatment fluid (e.g., pH, temperature, etc.) and/or interaction with some other substance. This may allow ease of pumping into the formation and, once therein, the treatment fluid may achieve its desired viscosity before being used to create or enhance a fracture (e.g., main fracture or branch fracture). In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place, or by frangibility of the encapsulating material such that the crosslinking agent is released upon encountering a stress (e.g., removal of hydraulic pressure and fracture closure).

The encapsulating material may be any material capable of delaying the action of the crosslinking agent including, but not limited to, a wax, polyvinyl alcohol, a polymer, a protein, a polysaccharide, a degradable material, or any combination thereof. Examples of such encapsulating materials may include, but are not limited to, polylactic acid, polyglycolic acid, a polyamide, a polyalkylene glycol (e.g., polyethylene glycol), polyvinyl alcohol, polyvinyl ester, polysiloxane, polyurethane, polyurethane copolymers, polyacrylic acid, a polyacrylic acid derivative, collagen, gelatin, a cellulose derivative (e.g., alkyl cellulose, hydroxyalkyl cellulose, cellulose acetate, and the like), and any combination thereof.

In certain embodiments, the crosslinking agent may be present in the treatment fluids in an amount in the range of from about 0.001% to about 0.1% wt/vol of the base fluid of the treatment fluid, encompassing any value and subset therebetween. For example, the crosslinking agent may be present in the range of from about 0.001% to about 0.02%, or about 0.02% to about 0.04%, or about 0.04% to about 0.06%, or about 0.06% to about 0.08%, or about 0.08% to about 0.1% wt/vol of the base fluid of the treatment fluid, encompassing any value and subset therebetween. Each of these values is critical to the performance of the methods described herein, where amount of crosslinking agent may depend on a number of factors including, but not limited to, the type of treatment fluid, the amount and type of gelling agent, the type of base fluid selected, the desired viscosity, and the like, and any combination thereof.

As discussed above, while a crosslinking agent may be included in any of the treatment fluids described herein, in some embodiments, the crosslinking affect may increase the viscosity of the low-viscosity fluids above the desired viscosity thereof. Accordingly, the low-viscosity treatment fluids may be "linear," meaning that they include a gelling agent, but do not include a crosslinking agent. In other embodiments, the low-viscosity treatment fluids may be a "slickwater" fluid. As used herein, the term "slickwater fluid" refers to the addition of a friction reducing agent to the base fluids described herein, such as polyacrylamide. Other friction reducing agents may include, but are not limited to, sepiolite, whelan gum, xanthan gum, hydroxyethyl cellulose, bentonite, attapulgite, and any combination thereof. When the low-viscosity treatment fluid is a slickwater fluid, the friction reducing agent may be included in the low-viscosity treatment fluid in an amount of from about 0.001% to about 0.2% wt/vol of the base fluid of the treatment fluid, encompassing any value and subset therebetween. For example, the friction reducing agent may be in the low-viscosity treatment fluid in an amount of from about 0.001% to about 0.04%, or about 0.04% to about 0.08%, or about 0.08% to about 0.12%, or about 0.12% to about 0.16%, or about 0.16% to about 0.2% wt/vol of the base fluid of the treatment fluid, encompassing any value and subset therebetween. Each of these values is critical to the performance of the methods described herein, where amount of friction reducing agent may depend on a number of factors including, but not limited to, the type of treatment fluid, the type of base fluid selected, the type of subterranean formation, and the like, and any combination thereof.

The material for forming the micro-sized proppant particulates and the macro-sized proppant particulates (collectively referred to herein simply as "proppant particulates") may be any material, naturally-occurring or man-made, suitable for use in a subterranean formation and appropriate for use in the embodiments as described herein. Suitable materials for forming the proppant particulates described herein may include, but are not limited to, sand (e.g., desert sand, beach sand), cementitious material (e.g., Portland cement, Portland cement blends (e.g., blast-furnace slag), and non-Portland cement (e.g., super-sulfated cement, calcium aluminate cement, high magnesium-content cement, and the like), and the like), bauxite, alumino-silicate material, ceramic material (e.g., ceramic microspheres), glass material, polymeric material (e.g., ethylene-vinyl acetate or composite materials), metal (e.g., alkali metals, alkaline earth metals, transition metals, post-transition metals, metalloids), zeolites, polytetrafluoroethylene material, thermoplastic material (e.g., nylon thermoplastic) nut shell pieces, a cured resinous particulate comprising nut shell pieces, seed shell pieces, a cured resinous particulate comprising seed shell pieces, fruit pit pieces, a cured resinous particulate comprising fruit pit pieces, wood, composite particulates, and any combination thereof. Suitable composite particulates may comprise a binder and a filler material, wherein suitable filler materials may include, but are not limited to, silica, alumina, fumed carbon, carbon black, graphite, mica, titanium dioxide, barite, meta-silicate, calcium silicate, kaolin, talc, zirconia, boron, fly ash, hollow glass microspheres, solid glass, nanoparticulates, and any combination thereof.

The shape of the proppant particulates may be such that it is substantially spherical or substantially non-spherical, which may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, cylinder-shaped, platelet-shaped, fiber-shaped, and any combination thereof. That is, in embodiments wherein the proppant particulates are substantially non-spherical, the aspect ratio of the material may range such that the material is fibrous to such that it is cubic, octagonal, or any other configuration.

The micro-sized proppant particulates for use in the micro-proppant fluids described may have a particle size distribution in the range of from about 0.1 micrometers (µm) to about 150 µm, encompassing any value and subset therebetween. The macro-sized proppant particulates for use in the macro-proppant fluids described herein may be in the range of from about 100 µm to about 800 µm, encompassing any value and subset therebetween.

In some embodiments, the macro-proppant particulates may be present in the treatment fluids of the present disclosure in an amount in the range of from about 0.25 pounds per gallon (lbm/gal) to about 10 lbm/gal, encompassing any value and subset therebetween. One pound per gallon is equivalent to 0.1198 kilograms per liter). For example, the macro-proppant particulates may be present in an amount of about 0.25 lbm/gal to about 2 lbm/gal, or about 2 lbm/gal to about 4 lbm/gal, or about 4 lbm/gal to about 6 lbm/gal, or about 6 lbm/gal to about 8 lbm/gal, or about 8 lbm/gal to about 10 lbm/gal, encompassing any value and subset therebetween. In other embodiments, the micro-proppant particulates may be present in the treatment fluids of the present disclosure in an amount in the range of from about 0.01 lbm/gal to about 1 lbm/gal, encompassing any value and subset therebetween. For example, the micro-proppant particulates may be present in an amount of from about 0.01 lbm/gal to about 0.2 lbm/gal, or about 0.2 lbm/gal to about 0.4 lbm/gal, or about 0.4 lbm/gal to about 0.6 lbm/gal, or about 0.6 lbm/gal to about 0.8 lbm/gal, or about 0.8 lbm/gal to about 1 lbm/gal, encompassing any value and subset therebetween. Each of these values is critical to the embodiments of the present disclosure and may depend on a number of factors including, but not limited to, the particular treatment fluid (e.g., the micro-proppant fluid or the macro-proppant fluid), the material forming the proppant particulates, the size selected for the proppant particulates, the type of subterranean formation, the size and shape of the main fracture(s) and branch fracture(s), and the like, and any combination thereof.

In some embodiments, a portion of the proppant particulates may be formed from degradable particles, provided that they meet the sizes for the micro-sized proppant particulates or macro-sized proppant particulates, depending on whether they are included in the low-viscosity micro-proppant fluid and the low-viscosity macro-proppant fluid, respectively. The degradable particles, whether serving as the micro-sized proppant particulates or the macro-sized proppant particulates, are collectively referred to herein as "degradable proppant particulates." One purpose of including degradable particulates is to increase the permeability of the propped fracture, such that after the degradable particulates degrade, interstitial spaces between the particulates in the proppant pack.

In some embodiments, the degradable particles used are oil-degradable materials. Where such oil-degradable proppant particulates are used, in the event the closure of the fracture undesirably compacts the proppant (thus undesirably reducing the permeability of the proppant pack) the oil-degradable proppant may be degraded by the produced fluids, thus restoring at least some of the lost permeability. The degradable proppant particulates may also be degraded by materials purposely placed in the formation by injection, mixing the degradable proppant particulates with delayed reaction degradation agents, or other suitable means to induce degradation.

In some embodiments, the degradable proppant particulates are preferably substantially uniformly distributed throughout a the formed proppant pack in the main fracture(s) or branch fracture(s). Over time, the degradable proppant particulates will degrade, in situ, causing the degradable proppant particulates to substantially be removed from the proppant pack and to leave behind voids therein. These voids enhance the porosity of the proppant pack, which may result, in situ, in enhanced conductivity.

Suitable degradable proppant particulates include oil-degradable polymers. Oil-degradable polymers that may be used in accordance with the embodiments of the present disclosure may be either natural or synthetic polymers. Suitable examples may include, but are not limited to, a polyacrylic, a polyamide, a polyolefin (e.g., polyethylene, polypropylene, polyisobutylene, polystyrene, and the like), and the like, and any combination thereof. Other suitable oil-degradable polymers include those that have a melting point which is such that the polymer will dissolve at the temperature of the subterranean formation in which it is placed, such as a wax material.

In some embodiments, it is desirable that the degradable proppant particulates have similar particle size, shape, and specific gravity as those of the proppant particulates described above. Such similarity may result in enhanced distribution of degradable proppant particulates among the non-degradable proppant particulates, thus minimizing the segregation of the two types of proppant particulates and thus maximizes distribution of the void spaces in the proppant pack upon degradation of the degradable proppant particulates.

Suitable examples of degradable polymers that may be used in accordance with the embodiments of the present disclosure may include, but are not limited to, a polysaccharide (e.g., dextran, cellulose, and the like), a chitin, a chitosan, a protein, an aliphatic polyester, a poly(lactide), a poly(glycolide), a poly(ε-caprolactone), a poly(hydroxybutyrate), a poly(anhydride), an aliphatic polycarbonate, an aromatic polycarbonate, a poly(orthoester), a poly(amino acid), a poly(ethylene oxide), a polyphosphazene, and any combination thereof. Of these suitable polymers, aliphatic polyesters and poly(anhydrides) may be preferred.

Poly(anhydrides) are another type of particularly suitable degradable polymer useful in the embodiments of the present disclosure. Poly(anhydride) hydrolysis proceeds, in situ, via free carboxylic acid chain-ends to yield carboxylic acids as final degradation products. The erosion time can be varied over a broad range of changes in the polymer backbone. Examples of suitable poly(anhydrides) may include, but are not limited to, poly(adipic anhydride), poly(suberic anhydride), poly(sebacic anhydride), poly(dodecanedioic anhydride), poly(maleic anhydride), poly(benzoic anhydride), and any combination thereof.

Dehydrated salts may be used in accordance with the embodiments of the present disclosure as degradable proppant particulates. A dehydrated salt is suitable for use in the embodiments of the present disclosure if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax), anhydrous boric acid, and any combination thereof. These anhydrous borate materials are only slightly soluble in water. However, with time and heat in a subterranean environment, the anhydrous borate materials react with surrounding aqueous fluid and are hydrated. The resulting hydrated borate materials are highly soluble in water as compared to anhydrous borate materials and, as a result, degrade in an aqueous fluid. In some instances, the total time required for the anhydrous borate materials to degrade in an aqueous fluid is in the range of from about 8 hours to about 72 hours, encompassing any value and subset therebetween, depending upon the temperature of the subterranean zone in which they are placed. Other examples include organic or inorganic salts like acetate trihydrate.

Blends of certain degradable materials may also be suitable as the degradable proppant particulates described herein. One example of a suitable blend of materials is a mixture of poly(lactic acid) and sodium borate, where the mixing of an acid and base could result in a neutral solution where this is desirable. Another example would include a blend of poly(lactic acid) and boric oxide. Other materials that undergo an irreversible degradation may also be suitable, if the products of the degradation do not undesirably interfere with either the conductivity of the proppant matrix or with the production of any of the fluids from the subterranean formation.

In some embodiments, a preferable result is achieved if the degradable proppant particulates degrade slowly over time as opposed to instantaneously. Even more preferable results have been obtained when the degradable proppant particulates does not begin to degrade until after the proppant pack has developed some compressive strength. The slow degradation of the degradable proppant particulates, in situ, helps to maintain the stability of the proppant pack.

In some embodiments of the present disclosure, from about 10% to about 90% of the total proppant particulates used in a treatment fluid are degradable proppant particulates. In other embodiments, from about 20% to about 70% of the total proppant particulates in a treatment fluid are degradable proppant particulates, or about 25% to about 50% of the total proppant particulates in a treatment fluid are degradable proppant particulates. Each of these values is critical to the embodiments of the present disclosure and may depend on a number of factors including, but not limited to, the size of the fracture(s), the type of subterranean formation, the size and size distribution of the micro-sized proppant particulates and/or the macro-sized proppant particulates that have included therewith degradable proppant particulates, and the like.

In some embodiments, the degradable proppant particulates are fiber-shaped, which may beneficially act to increase the ability of the micro-proppant fluid to suspend the micro-sized proppant particulates and the macro-sized proppant fluid to suspend the macro-sized proppant particulates, thus decreasing the need to additional, and perhaps costly additives, to ensure that such proppant remains in suspension. The fiber-shape may further facilitate forming at least partial monolayer of micro-sized proppant and the proppant pack of macro-sized proppant by allowing a web-like complex to be formed for propping open branch and main fractures, as described herein. The fiber-shaped degradable proppant particulates include all known shapes having a medium to high aspect ratio, defined as an aspect ratio of greater than about 5, 10, or 25 to an unlimited upper limit, including greater than about 500, 5000, or 10000, encompassing every value and subset therebetween.

The degradable diversion agents for use in the low-viscosity diversion fluids of the present disclosure may be any degradable diversion agent capable of diverting the distribution of a treatment fluid across a first location (e.g. treatment interval or portion of a treatment interval) for use in another location (e.g., another treatment interval or a portion of the same treatment interval). Such degradable diversion agents create a temporary blocking effect that promotes continued treatment in a different area of a wellbore, enabling enhanced productivity across a length of the wellbore. In some embodiments, as described above, the degradable diversion agents are used for far-field diversion. In such cases, the size of the degradable diversion agents should be about +/−20% of the size of the micro-sized proppant particulates in order to embed in the interstitial spaces therebetween and form a seal in the mouth of the branch fracture(s). In those embodiments, as described above, where the degradable diversion agents are used for near-wellbore diversion, the size of the degradable diversion agents should be about +/−20% of the size of the macro-sized proppant particulates in order to embed in the interstitial spaces therebetween and form a seal in the mouth of the main fracture(s).

The degradable diversion agents may additionally be of any size or shape mentioned above with reference to the proppant particulates. As an example, the degradable diversion agents may be fiber-shaped, which may beneficially act to increase the ability of the low-viscosity diversion fluids to maintain the degradable diversion agents in suspension for placement in the far-field or near-wellbore areas for forming a fluidic seal. Moreover, the fiber-shaped degradable diversion agents may decrease the need to additional, and perhaps costly additives, to ensure that such degradable diversion agents remain in suspension in the low-viscosity diversion fluids, particularly due to their low-viscosity nature. The fiber-shape may further facilitate forming the fluidic seal because the fiber-shape facilitates embedment into and between proppant particulates, thereby forming a tighter or more impermeable fluidic seal. Like the proppant particulates described above, the fiber-shaped degradable diversion agents include all known shapes having a medium to high aspect ratio, defined as an aspect ratio of greater than about 5, 10, or 25 to an unlimited upper limit, including greater than about 500, 5000, or 10000, encompassing every value and subset therebetween.

Suitable degradable diversion agents may include, but are not limited to, materials comprising a fatty alcohol, a fatty ester, a proteinous material, a fatty acid salt, and any combination thereof. Examples of suitable fatty alcohols may include, but are not limited to, a montanyl alcohol; a tert-butylhydroquinone; a cholesterol; a cholesteryl nonanoate; a benzoin; a borneol; an exo-norborneol; a glyceraldehyde triphenylmethanol; a dimethyl terephthalate; a camphor; a cholecalciferol; a ricinoleyl alcohol; a 1-Heptacosanol; a 1-Tetratriacontanol; a 1-Dotriacontanol; a 1-Hentriacontanol; a 1-Tricontanol; a 1-Nonacosanol; a 1-Octasanol; a 1-Hexacosanol; a 1,14-Tetradecanediol; a 1,16-Hexadecanediol; a 1,17-Heptadecanediol; a 1,18-Octadecanediol; a 1,19-Nonadecanediol; a 1,20-Eicosanediol; a 1,21-Heneicosanediol; a 1,22-Docosanediol; a myricyl alcohol; and any combination thereof. Examples of suitable fatty esters for use in forming the degradable diversion agents described herein may include, but are not limited to, prednisolone acetate, cellobiose tetraacetate, terephthalic acid dimethyl ester, an ester wax (e.g., carnauba wax, ouricouri wax, olho wax, flora wax, palha wax, castor wax, opalwax, and the like), and the like, and any combination thereof.

As used herein, the term "proteinous material," and grammatical variants thereof, for use in forming the degradable diversion agents herein refers to any group of complex organic macromolecules that contain carbon, hydrogen, oxygen, nitrogen, and/or sulfur and are composed of one or more chains of amino acids. Examples of suitable proteinous material may include, but are not limited to, prolamins, such as gliadin, hordein, secalin, zein, avenin, and any combination thereof. Examples of suitable fatty acids for use as a degradable diversion agent may include, but are not limited to, sucrose distearate, calcium stearate, glyceryl monostearate, zinc stearate, and magnesium stearate, and the like, and any combination thereof.

In some embodiments, the degradable diversion agents may be included in the low-viscosity diversion fluids of the present disclosure in an amount in the range of from about 0.01% to about 10% by wt/vol of the base fluid in the low-viscosity diversion fluid, encompassing any value and subset therebetween. For example, the degradable diversion agents may be included in the low-viscosity diversion fluids in an amount of from about 0.01% to about 0.1%, or about 0.1% to about 1%, or about 1% to about 2%, or about 2% to about 4%, or about 4% to about 6%, or about 6% to about 8%, or about 8% to about 10% by wt/vol of the base fluid in the low-viscosity diversion fluid, encompassing any value and subset therebetween. Each of these values are critical to the embodiments of the present disclosure and may depend on a number of factors including, but not limited to, the type(s) of degradable diversion agents used, the desired time prior to degradation of the degradable diversion agents, the size and shape of the mouth of the opening(s) for forming the fluidic seals, and the like, and any combination thereof.

In some embodiments, any of the treatment fluids (i.e., the high-viscosity pad fluid, the low-viscosity micro-proppant fluid, the low-viscosity macro-proppant fluid, and the low-viscosity diversion fluid) of the present disclosure may further comprise a breaker. As used herein, the term "breaker" refers to any substance that is capable of decreasing the viscosity of a fluid. The breaker may be activated to reduce the viscosity of a treatment to facilitate removal of at least a portion of the broken treatment fluid from the wellbore and to the surface. In some embodiments, the breaker may be included in a spacer fluid included prior to the introduction of the low-viscosity macro-proppant fluid and/or the low-viscosity diversion fluid. That is, the spacer fluid may be included after the alternating introduction of the high-viscosity pad fluid and the low-viscosity macro-proppant fluid. The spacer fluid may comprise the same base fluids described for any of the treatment fluids herein and have a viscosity and flow rate in the range of those provided with reference the low-viscosity treatment fluids herein.

In some embodiments, the breaker may be delayed by encapsulation with a coating (e.g., a porous coating through which the breaker may diffuse slowly, or a degradable coating that degrades downhole) that delays the release of the breaker. In other embodiments, the breaker may be a degradable material (e.g., poly(lactic) acid or poly(glycolic acid)) that releases an acid or alcohol in the presence of a base liquid, such as an aqueous base fluid. Suitable breakers for use in the treatment fluids described herein may include, but are not limited to, an oxidative breaker, an acid breaker (e.g., a chelating agent breaker), a delayed release acid breaker, a delayed release enzyme breaker, a chelating agent breaker, a temperature activated breaker, a hydrolysable ester breaker, any encapsulated in an encapsulating material, and any combination thereof. The encapsulating material may be any material capable of delaying the activity of the breaker including, but not limited to, those discussed herein with reference to crosslinking agents above.

Examples of oxidative breakers may include, but are not limited to, organic peroxides, alkali metal persulfates, alkali metal chlorites, bromates, chlorates, hypochlorites, permanganates, and any combination thereof. Examples of acid breakers may include, but are not limited to, hydrochloric acid, hydrofluoric acid, hydrobromic acid, hydroiodic acid, sulfuric acid, nitric acid, boric acid, chromic acid, ethylenediaminetetraacetic acid, nitrilotriacetic acid, hydroxyethylethylenediaminetriacetic acid, dicarboxymethyl glutamic acid tetrasodium salt, diethylenetriaminepentaacetic acid, propylenediaminetetraacetic acid, ethylenediaminedi(o-hydroxyphenylacetic) acid, glucoheptonic acid, gluconic acid, and any combination thereof. Examples of delayed release acid breakers may include, but are not limited to, acetic anhydride and organic and inorganic acids such as fumaric acid, benzoic acid, sulfonic acid, phosphoric acids, aliphatic polyesters, poly(lactides), poly(anhydrides), poly(amino acids), any derivatives thereof, and any combination thereof. Acid breakers, as well as chelating agent breakers described below, may be particularly useful for breaking treatment fluids comprising borate or metal crosslinking agents. As used herein, "derivative" refers to any compound that is made from one of the listed compounds, for example, by replacing one atom in the compound with another atom or group of atoms, ionizing the compound, or creating a salt of the compound. "Derivative" also refers to any unneutralized species of any of the listed compounds.

Examples of suitable delayed release enzyme breakers may include, but are not limited to, alpha and beta amylases, exo- and endo-glucosidases, amyloglucosidase, oligoglucosidase, invertase, maltase, cellulase, hemicellulase, endoglucosidase, endo-xylanase, exo-xylanase, and any combination thereof. In some embodiments, the enzyme breakers are enzymes or combinations of enzymes that attack the glucosidic linkages of a cellulose gelling agent backbone and degrade the gelling agent into mostly monosaccharide and disaccharide units. Temperature activated breakers may activate by being heated by a subterranean formation in which they are placed, or by another external heat source. Examples of suitable temperature activated breakers may include, but are not limited to, alkaline earth metal peroxides, such as calcium peroxide and magnesium peroxide, zinc peroxide, and any combination thereof. Examples of suitable hydrolysable esters may include, but are not limited to, sorbitol, catechol, dimethyl glutarate and mixtures of dimethyl glutarate, dimethyl succinate, dimethyl adipate, and any combination thereof.

In certain embodiments, the breaker may be present in the treatment fluids (or spacer fluids) of the present disclosure in an amount in the range of from about 0.001% to about 5% by weight of the gelling agent included in the treatment fluid (or spacer fluid), encompassing any value and subset therebetween. For example, the breaker may be present in an amount of from about 0.001% to about 0.01%, or about 0.01% to about 0.1%, or about 0.1% to about 1%, or about 1% to about 2%, or about 2% to about 3%, or about 3% to about 4%, or about 4% to about 5% by weight of the gelling agent included in the treatment fluid (or spacer fluid), encompassing any value and subset therebetween. Each of these values are critical to the embodiments of the present disclosure and may depend on a number of factors including, but not limited to, the amount and type of gelling agent included in a treatment fluid, the amount and type of crosslinking agent, if any, included in a treatment fluid, the desired time for breaking the treatment fluid, and the like, and any combination thereof.

In some embodiments, any of the treatment fluids of the present disclosure may comprise a consolidating agent. When included in a proppant-free or particulate-free treatment fluid, such as the high-viscosity pad fluid described herein, the consolidating agent may coat at least a portion of a face of the subterranean formation, such as a face of the main fracture created or enhanced in accordance with the embodiments described herein. As used herein, the term "face" with reference to a formation, including a face of a fracture (e.g., main fracture(s) and/or branch fracture(s)), refers to an area of a formation that is contactable with an introduced treatment fluid. When included in a proppant or particulate treatment fluid, such as the low-viscosity micro-proppant fluid, the low-viscosity macro-proppant fluid, and/or the low-viscosity diversion fluid, may coat at least a portion of a face of the subterranean formation, such as a fracture, and/or coat at least a portion of an outer surface a proppant particulate or degradable diversion particulate. As used herein, the term "surface" will be used collectively to refer to coating of a consolidating agent on at least a portion of a face of a formation or an outer surface of a proppant or degradable diversion particulate. Additionally, as used herein, the term "particulates" includes both the proppant particulates (micro-sized and macro-sized) and the degradable diversion particulates.

Coating a surface with the consolidating agent enhance grain to grain contact between individual particulates, whether the same or different, or between particulates and a face of a fracture, thereby enhancing the structure of the particulates to withstand closure stress, aggregate to form proppant particulates, aggregate to form the fluidic seal described herein, and the like. Moreover, the consolidating agent may stabilize soft portions of a fracture, and prevent particulate embedment therein. The term "coating," and grammatical variants thereof (e.g., "coated," "coat," and the like) with reference to coating a surface (e.g., a face of a formation or an outer surface of particulates) described herein does not imply complete coverage of the surface, but rather that at least about 50% (or at least about 60%, 70%, 80%, 90%, or 100%) of the surface thereof.

Suitable consolidation agents may include, but are not limited to, a non-aqueous tackifying agent, an aqueous tackifying agent, a silyl-modified polyamide compound, a curable resin, a crosslinkable aqueous polymer composition, a polymerizable organic monomer composition, a zeta potential-modifying aggregating composition, a silicon-based resin, a binder, a consolidation agent emulsion, and any combination thereof. Such combinations may include, for example, use of a non-curable consolidation agent (e.g., one that does not cure into a solid, hardened mass) and/or a curable consolidation agent.

When coated onto a surface, the consolidation agents may be coated thereon on-the-fly by including the consolidation agent in the treatment fluid along with the proppant particulates, and directly prior to pumping the fluid into the formation. As used herein, the term "on-the-fly" refers to performing an operation during a subterranean treatment that does not require stopping normal operations. In other instances, the consolidation agents may be coated onto a surface of the particulates directly before including them into a treatment fluid to be pumped into the formation (i.e., pre-coated).

For use in the embodiments described herein, the non-aqueous tackifying agents may comprise polyamides that are liquids or in solution at the temperature of the subterranean formation such that they are, by themselves, non-hardening when introduced into the subterranean formation. A particularly preferred product is a condensation reaction product comprised of a polyacid and a polyamine. The non-aqueous tackifying agents may further comprise amounts of dibasic acids containing some trimer and higher oligomers and also small amounts of monomer acids that are reacted with polyamines, without departing from the scope of the present disclosure. Other polyacids for use as the non-aqueous tackifying agents may include, but are not limited to, trimer acids, synthetic acids produced from fatty acids, maleic anhydride, acrylic acid, and the like, and combinations thereof. Additional compounds which may be used as non-aqueous tackifying agents include liquids and solutions of, for example, polyesters, polycarbonates, silyl-modified polyamide compounds, polycarbamates, urethanes, natural resins such as shellac, and the like. Combinations of these may be suitable as well.

Multifunctional materials suitable for use in the present disclosure may include, but are not limited to, an aldehyde (e.g., formaldehyde), a dialdehyde (e.g., glutaraldehyde, hemiacetals or aldehyde releasing compounds), a diacid halide, a dihalide (e.g., dichlorides and dibromides), a polyacid anhydride (e.g., citric acid, epoxides, furfuraldehyde, glutaraldehyde or aldehyde condensates), and any combination thereof. In some embodiments, the multifunctional material may be mixed with the non-aqueous tackifying agent in an amount of from about 0.01% to about 50% by weight of the non-aqueous tackifying agent, encompassing any value and subset therebetween. In other embodiments, the multifunctional material may be mixed with the non-aqueous tackifying agent in an amount of from about 0.5% to about 1% by weight of the non-aqueous tackifying agent.

Suitable aqueous tackifying agents may include any polymer that can bind particulates or formation faces, or coagulate and/or flocculate particulates. Also, polymers that function as pressure-sensitive adhesives may be suitable. Examples of aqueous tackifying agents suitable for use in the embodiments herein may include, but are not limited to, an acrylic acid polymer, an acrylic acid ester polymer, an acrylic acid derivative polymer, an acrylic acid homopolymer, an acrylic acid ester homopolymer (e.g., poly(methyl acrylate), poly(butyl acrylate), poly(2-ethylhexyl acrylate), and the like), an acrylic acid ester co-polymer, a methacrylic acid derivative polymer, a methacrylic acid homopolymer, a methacrylic acid ester homopolymer (e.g., poly(methyl methacrylate), poly(butyl methacrylate), poly(2-ethylhexyl methacrylate), and the like), an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, and any combination thereof.

Aqueous tackifying agents may comprise at least one member selected from the group consisting of benzyl coco di-(hydroxyethyl) quaternary amine, p-T-amyl-phenol condensed with formaldehyde, and a copolymer comprising from about 80% to about 100% $C_1$-$C_{30}$ alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. The term "copolymer," as used herein, is not limited to polymers comprising two types of monomeric units, but includes any combination of monomeric units, e.g., terpolymers, tetrapolymers, and the like.

Suitable hydrophillic monomers may be any monomer that will provide polar oxygen-containing or nitrogen-containing groups. Suitable hydrophillic monomers may include, but are not limited to, dialkyl amino alkyl (meth) acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or acrylic acid, hydroxyethyl acrylate, acrylamide, and the like. Combinations of these may be suitable as well. These copolymers can be made by any suitable emulsion polymerization technique.

Resins suitable for use as a consolidation agent of the embodiments of the present disclosure may include any resin capable of forming a hardened, consolidated mass upon curing. Many such resins are commonly used in subterranean operations, and some suitable resins may include, but are not limited to, two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, silicon-based resins, polyester resins and hybrids and copolymers thereof, polyurethane resins and hybrids and copolymers thereof, acrylate resins, silicon-based resins, and any combination thereof.

Some suitable resins, such as epoxy resins, may be cured with an internal catalyst or activator so that when pumped downhole, they may be cured using time and temperature. Other suitable resins, such as furan resins generally require a time-delayed catalyst or an external catalyst to help activate the polymerization of the resins if the cure temperature is low (i.e., less than about 121° C. (about 250° F.), but will cure under the effect of time and temperature, as well as a subterranean formation having a formation temperature above about 121° C. (about 250° F.), preferably above about 149° C. (about 300° F.). It is within the ability of one skilled in the art, with the benefit of this disclosure, to select a suitable resin for use in embodiments of the present disclosure and to determine whether a catalyst is required to trigger curing. By way of example, a silicon-based resin system as may be used as a more eco-friendly choice in cases where epoxy or furan-based resins pose environmental concerns.

Any solvent that is compatible with the resin and achieves the desired viscosity effect is suitable for use in the embodiments of the present disclosure, such as to prepare the resin to coat a surface. Suitable solvents may include, but are not limited to, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and butylglycidyl ether, and any combination thereof. Other solvents may include, but are not limited to, aqueous dissolvable solvents such as, methanol, isopropanol, butanol, and glycol ether solvents, and combinations thereof. Suitable glycol ether solvents may include, but are not limited to, diethylene glycol methyl ether, dipropylene glycol methyl ether, 2-butoxy ethanol, ethers of a C2 to C6 dihydric alkanol containing at least one C1 to C6 alkyl group, mono ethers of dihydric alkanols, methoxypropanol, butoxyethanol, and hexoxyethanol, and isomers thereof. Selection of an appropriate solvent is dependent on at least the resin composition chosen.

Suitable silyl-modified polyamide compounds that may be used as a consolidation agent in the embodiments of the present disclosure are those that are substantially self-hardening compositions capable of at least partially adhering to a surface in an unhardened state, and that are further capable of self-hardening into a substantially non-tacky state. Such silyl-modified polyamides may be based, for example, on the reaction product of a silating compound with a polyamide or a combination of polyamides. The polyamide or combination of polyamides may be one or more polyamide intermediate compounds obtained, for example, from the reaction of a polyacid (e.g., diacid or higher) with a polyamine (e.g., diamine or higher) to form a polyamide polymer with the elimination of water.

In other embodiments, the consolidation agent may comprise crosslinkable aqueous polymer compositions. Generally, suitable crosslinkable aqueous polymer compositions comprise an aqueous solvent, a crosslinkable polymer, and a crosslinker. The aqueous solvent may be any aqueous solvent in which the crosslinkable composition and the crosslinker may be dissolved, mixed, suspended, or dispersed to facilitate gel formation. For example, the aqueous solvent used may be freshwater, salt water, brine, seawater, or any other aqueous liquid that does not adversely react with the other components used in accordance with this disclosure or with a subterranean formation.

Examples of crosslinkable aqueous polymer compositions for use as the consolidation agents described herein may include, but are not limited to, carboxylate-containing polymers and acrylamide-containing polymers. The most suitable polymers are thought to be those that would absorb or adhere to proppant particulate surfaces. Examples of suitable acrylamide-containing polymers may include, but are not limited to, polyacrylamide, partially hydrolyzed polyacrylamide, copolymers of acrylamide and acrylate, carboxylate-containing terpolymers, tetrapolymers of acrylate, and any combination thereof. Additional examples of suitable crosslinkable aqueous polymers may include, but are not limited to, hydratable polymers comprising polysaccharides and derivatives thereof, and that contain one or more of the monosaccharide units: galactose, mannose, glucoside, glucose, xylose, arabinose, fructose, glucuronic acid, or pyranosyl sulfate. Suitable natural hydratable polymers may include, but are not limited to, guar gum, locust bean gum, tara gum, konjak, tamarind, starch, cellulose, karaya, xanthan, tragacanth, and carrageenan, any derivative thereof, and any combination thereof.

Suitable hydratable synthetic polymers and copolymers that may be used as the crosslinkable aqueous polymer compositions may include, but are not limited to, polycarboxylates (e.g., polyacrylates and polymethacrylates), polyacrylamides, methylvinyl ether polymers, polyvinyl alcohols, polyvinylpyrrolidone, any derivative thereof, and any combination thereof. The crosslinkable polymer used should be included in the crosslinkable aqueous polymer composition in an amount sufficient to form the desired gelled substance for coating onto a proppant particulate. In some embodiments, the crosslinkable polymer may be included in the crosslinkable aqueous polymer composition in an amount in the range of from about 1% to about 30% by weight of the aqueous solvent, encompassing any value and subset therebetween. In another embodiment, the crosslinkable polymer may be included in the crosslinkable aqueous polymer composition in an amount in the range of from about 1% to about 20% by weight of the aqueous solvent.

The crosslinkable aqueous polymer compositions of the embodiments described herein further comprise a crosslinker for crosslinking the crosslinkable polymers to form the desired gelled substance for coating onto the proppant particulates. In some embodiments, the crosslinker is a molecule or complex containing a reactive transition metal cation. In some embodiments, the crosslinker may comprise trivalent chromium cations complexed or bonded to anions, atomic oxygen, or water. Examples of suitable crosslinkers may include, but are not limited to, compounds or complexes containing chromic acetate and/or chromic chloride. Other suitable transition metal cations may include, but are not limited to, chromium VI within a redox system, aluminum III, iron II, iron III, and zirconium IV. Combinations of these crosslinkers may also be suitable.

The crosslinker may be present in the crosslinkable aqueous polymer compositions of the embodiments of the present disclosure in an amount sufficient to provide, among other things, the desired degree of crosslinking. In some embodiments, the crosslinker may be present in the crosslinkable aqueous polymer compositions in an amount in the range of from about 0.01% to about 5% by weight of the crosslinkable aqueous polymer composition, encompassing any value and subset therebetween. The exact type and amount of crosslinker(s) used may depend upon the specific crosslinkable polymer to be crosslinked, formation conditions, if crosslinked downhole, and the like.

Optionally, the crosslinkable aqueous polymer compositions may further comprise a crosslinking delaying agent, such as a polysaccharide crosslinking delaying agent derived from guar, guar derivatives, cellulose derivatives, or combinations thereof. The crosslinking delaying agent may be included in the crosslinkable aqueous polymer compositions, among other things, to delay crosslinking of the crosslinkable aqueous polymer compositions until desired (e.g., to control the timing of the curing of the consolidation agent coated onto at least a portion of a surface).

In other embodiments, the consolidation agent may comprise polymerizable organic monomer compositions. Generally, suitable polymerizable organic monomer compositions comprise an aqueous fluid, a water-soluble polymerizable organic monomer, an oxygen scavenger, and a primary initiator. The aqueous fluid component of the polymerizable organic monomer composition generally may be freshwater, salt water, brine, seawater, or any other aqueous liquid that does not adversely react with the other components used in accordance with this disclosure, including those provided as part of the fluids described herein.

A variety of monomers may be suitable for use as the water-soluble polymerizable organic monomers in the embodiments of the present disclosure. Examples of suitable monomers may include, but are not limited to, acrylic acid, methacrylic acid, acrylamide, methacrylamide, 2-methacrylamido-2-methylpropane sulfonic acid, dimethylacrylamide, vinyl sulfonic acid, N,N-dimethylaminoethylmethacrylate, 2-triethylammoniumethylmethacrylate chloride, N,N-dimethyl-aminopropylmethacryl-amide, methacrylamidepropyltriethylammonium chloride, N-vinyl pyrrolidone, vinylphosphonic acid, and methacryloyloxyethyl trimethylammonium sulfate, and any combination thereof. In some embodiments, the water-soluble polymerizable organic monomer should be self-crosslinking. Examples of suitable monomers which are thought to be self-crosslinking may include, but are not limited to, hydroxyethylacrylate, hydroxymethylacrylate, hydroxyethylmethacrylate, N-hydroxymethylacrylamide, N-hydroxymethyl-methacrylamide, polyethylene amine, polyethylene glycol acrylate, polyethylene glycol methacrylate, polypropylene glycol acrylate, and polypropylene glycol methacrylate, and any combination thereof. Of these, hydroxyethylacrylate may be preferred in some instances. An example of a particularly suitable monomer is hydroxyethylcellulose-vinyl phosphoric acid.

The water-soluble polymerizable organic monomer (or monomers where a combination thereof is used) should be included in the polymerizable organic monomer composition in an amount sufficient to form the desired gelled substance after placement on a surface. In some embodiments, the water-soluble polymerizable organic monomer may be included in the polymerizable organic monomer composition in an amount in the range of from about 1% to about 30% by weight of the aqueous fluid, encompassing any value and any subset therebetween. In another embodiment, the water-soluble polymerizable organic monomer may be included in the polymerizable organic monomer composition in an amount in the range of from about 1% to about 20% by weight of the aqueous fluid.

The presence of oxygen in the polymerizable organic monomer composition may inhibit the polymerization process of the water-soluble polymerizable organic monomer or monomers, which may allow control over (e.g., delay) the curing of the polymerizable organic monomer composition. In some embodiments, an oxygen scavenger, such as stannous chloride, may be included in the polymerizable monomer composition. In order to improve the solubility of stannous chloride so that it may be readily combined with the polymerizable organic monomer composition, the stannous chloride may be pre-dissolved in a hydrochloric acid solution. For example, the stannous chloride may be dissolved in about a 0.1% by weight aqueous hydrochloric acid solution in an amount of about 10% by weight of the resulting solution. The resulting stannous chloride-hydrochloric acid solution may be included in the polymerizable organic monomer composition in an amount in the range of from about 0.005% to about 10% by weight of the polymerizable organic monomer composition, encompassing any value and any subset therebetween. Generally, the stannous chloride may be included in the polymerizable organic monomer composition of the embodiments of the present disclosure in an amount in the range of from about 0.005% to about 0.1% by weight of the polymerizable organic monomer composition.

A primary initiator may be used, among other things, to initiate curing (i.e., polymerization) of the water-soluble polymerizable organic monomer(s). Any compound or compounds that form free radicals in aqueous solution may be used as the primary initiator. The free radicals may act, among other things, to initiate polymerization of the water-soluble polymerizable organic monomer present in the polymerizable organic monomer composition. Compounds suitable for use as the primary initiator may include, but are not limited to, alkali metal persulfates, peroxides, oxidation-reduction systems employing reducing agents (e.g., sulfites in combination with oxidizers), azo polymerization initiators, and any combination thereof. Suitable azo polymerization initiators may include, but are not limited to, 2,2'-azobis(2-imidazole-2-hydroxyethyl) propane, 2,2'-azobis(2-aminopropane), 4,4'-azobis(4-cyanovaleric acid), 2,2'-azobis(2-methyl-N-(2-hydroxyethyl) propionamide, and any combination thereof. Generally, the primary initiator should be present in the polymerizable organic monomer composition in an amount sufficient to initiate polymerization of the water-soluble polymerizable organic monomer(s). In certain embodiments, the primary initiator may be present in the polymerizable organic monomer composition in an amount in the range of from about 0.1% to about 5% by weight of the water-soluble polymerizable organic monomer(s), encompassing any value and any subset therebetween. Of note, as the polymerization temperature increases, the required level of activator decreases.

Optionally, the polymerizable organic monomer compositions further may comprise a secondary initiator. A secondary initiator may be used, for example, where the polymerizable organic monomer composition is placed into a subterranean formation that is relatively cool as compared to the surface, such as when placed below the mud line in offshore operations. The secondary initiator may be any suitable water-soluble compound or compounds that may react with the primary initiator to provide free radicals at a lower temperature. An example of a suitable secondary initiator is triethanolamine. In some embodiments, the secondary initiator is present in the polymerizable organic monomer composition in an amount in the range of from about 0.1% to about 5% by weight of the water-soluble polymerizable organic monomer(s), encompassing any value and any subset therebetween.

Also optionally, the polymerizable organic monomer compositions of the embodiments of the present disclosure may further comprise a crosslinker for crosslinking the polymerizable organic monomer compositions (e.g., into a gelled substance). In some embodiments, the crosslinker may be any crosslinker capable of crosslinking the polymerizable organic monomer composition that does not adversely interfere with the proppant particulates, or the fluids described herein. Examples of suitable crosslinkers include those discussed previously with reference to crosslinkable aqueous polymer compositions. Generally, the crosslinker may be present in polymerizable organic monomer compositions in an amount in the range of from about 0.01% to about 5% by weight of the polymerizable organic monomer composition, encompassing any value and any subset therebetween.

In some embodiments, the consolidation agent may comprise a binder. Suitable binders may generally comprise 1) a hydrolysate or heterocondensate of at least one hydrolysable silicon compound and at least one metal, phosphorus or boron compound, the metal being selected from Al, Ge, Sn, Pb, Ti, Mg, Li, V, Nb, Ta, Zr and Hf; 2) an organic polymerizable or polycondensable monomer or oligomer; and, 3) a buffer, so that the pH of the buffered binder is in the range from 2 to 7, and optionally a complexing agent, if appropriate, the at least one hydrolysable silicon compound comprising one or more hydrolysable silicon compounds having at least one nonhydrolysable group or oligomers thereof. Such binders are suitable for consolidating bulk or loose substrates.

Other binders suitable for using the embodiments of the present disclosure may generally comprise:

(I) a consolidant comprising a hydrolyzate or precondensate of:

(a) at least one organosilane of the general Formula IV:

$$R_nSiX_{4-n} \qquad \text{Formula IV}$$

in which the R radicals are the same or different and are each hydrolytically non-removable groups, the X radicals are the same or different and are each hydrolytically removable groups or hydroxyl groups and n is 1, 2 or 3, (b) optionally at least one hydrolyzable silane of the general Formula V:

SiX4  Formula V in which the X radicals are each as defined above, and
(c) at least one metal compound of the general Formula VI:

MXa  Formula VI in which M is a metal of main groups I to VIII or of transition groups II to VIII of the Periodic Table of the Elements including boron, X is as defined in Formula IV, where two X groups may be replaced by one oxo group, and a corresponds to the valence of the element, where the molar ratio of silicon compounds used to metal compounds used is in the range from 8000:1 to 8:1, is infiltrated or injected into the geological formation and, (II) the consolidation agent is cured under elevated pressure and elevated temperature, where the consolidation agent, in the case that it is used to change the wetting behavior of the formation, also comprises an oleophobic and hydrophobic component. Comprehensive investigations have shown that these consolidation agents are not decomposed even in autoclaves at high pressure and high temperature even over a prolonged period, and also still form a stable bond under these conditions. In the case of a wetting-regulating consolidation agent variant, it was shown that the wetting behavior established is retained after a hydrothermal treatment in corrosive medium. The consolidation also reduces the porosity only to a slight degree.

Suitable silicon-based resins for use as the consolidation agents described herein may include polysiloxanes, which are liquid substances having low viscosity, excellent curing workability, and excellent heat resistance once cured. Suitable polysiloxanes may be obtained by hydrolysis and polycondensation of a silicon compound having three hydrolyzable groups, a silicon compound having two hydrolyzable groups and a silicon compound having one hydrolyzable group. Suitable polysiloxanes have a hydrosilylatable carbon-carbon unsaturated group, a hydrosilyl group (a group containing Si—H bond) and an alkoxysilyl group, and have a number-average molecular weight of 500 to 20,000, and that is obtained by conducting a hydrolysis and polycondensation reaction of a silicon compound (T) having three hydrolyzable groups, a silicon compound (D) having two hydrolyzable groups, and a silicon compound (M) having one hydrolyzable group. The polysiloxane of the embodiments of the present disclosure may be a compound that has a silsesquioxane unit (hereinafter referred to as a "structural unit T") deriving from the silicon compounds (T), (D) and (M), a silicone unit (hereinafter referred to as a "structural unit D"), and a monofunctional siloxane unit (hereinafter referred to as a "structural unit M").

At least one compound of the silicon compound (T), the silicon compound (D), and the silicon compound (M) has a hydrosilyl group among the silicon compounds (T), (D) and (M), and at least one compound of the silicon compound (T), the silicon compound (D), and the silicon compound (M) has a hydrosilylatable carbon-carbon unsaturated group. This unsaturated group usually binds to a silicon atom and is an organic group having carbon atoms of 2 to 10 containing a double bond or a triple bond. Specific examples of the unsaturated group may include, but are not limited to, a vinyl group, an ortho styryl group, a meta styryl group, a para styryl group, an acryloyl group, a methacryloyl group, an acryloxy group, a methacryloxy group, a 1-propenyl group, a 1-butenyl group, a 1-pentenyl group, a 3-methyl-1-butenyl group, a phenylethenyl group, an ethynyl group, a 1-propynyl group, a 1-butynyl group, a 1-pentinyl group, a 3-methyl-1-butynyl group, a phenylbutynyl group, and the like, and any combination thereof.

The silicon compound having the unsaturated group may have only one unsaturated group or two or more unsaturated groups. In the case where the compound has two or more unsaturated groups, the unsaturated groups may be the same or different from each other. Additionally, the two or more unsaturated groups may be bound to the same silicon atom or to a plurality of silicon atoms. It is noted that when a polysiloxane obtained using a silicon compound in which the unsaturated group is bound to the same silicon atom is subjected to curing, an unreacted vinyl group may easily remain due to steric hindrance, and heat resistance might become insufficient. Therefore, the silicon compound having the unsaturated group is preferably a compound in which one unsaturated group is bound to one silicon atom.

Other suitable silicon-based resins include (a) a compound comprising a reactive group of Formula I:

—X—SiR"x(OR')3-z  Formula I wherein X comprises a hydrocarbon chain; wherein x=0 to 2 and z=0 to 2; wherein R' and R" comprises hydrogen, a halogen, an amide, an amide, a hydrocarbon chain, carboxy (e.g., acetoxy), alkoxy (e.g., ethoxy, methoxy), a hydrocarbon chain comprising a heteroatom, and/or a hydrocarbon chain comprising a carbonyl group; and wherein when x is 2, then each R" may be the same (identical) or different; and wherein when z is 0 or 1, then each R' may be the same or different; and (b) a polysiloxane comprising a reactive functional group that comprises at least one of the following structural units of Formula II:

R1nR2mSiO(4−n−m)/2  Formula II wherein R1 comprises hydrogen, hydroxyl, a hydrocarbon chain, or a siloxane chain; wherein R2 comprises a functional group; and wherein m and n fulfill the requirements of 0<n<4, 0<m<4 and 2<(m+n)<4; and wherein when n>1, then each R1 may be the same or different; and wherein when m>1, then each R2 may be the same or different. In certain embodiments, the functional group of R2 comprises hydroxyl, carboxyl, isocyanate, blocked (poly)isocyanate, primary amine, secondary amine, amide, carbamate, urea, urethane, vinyl, unsaturated ester, maleimide, fumarate, anhydride, hydroxyl alkylamide, epoxy, or combinations thereof.

Other suitable silicon-based resins may include a compound comprising an organofunctional polysiloxane polymer as a binding resin obtaining the polymeric structure as part of a curing mechanism or a combination thereof. The curing mechanism of such siloxane coatings is a two-step mechanism. First, a hydrolysable group attached to the silicon atom is split off in a reaction with water, to form a silanol. The silanol then reacts with another silanol in a condensation reaction to form a silicon-oxygen-silicon chemical bonding which is characteristic for siloxane coatings. The hydrolysable group can be a halogen, ketoxime or acetoxy groups, but the most common is alkoxy group. Suitable such silicon-based resins comprise:

a) a polysiloxane having the following Formula III:

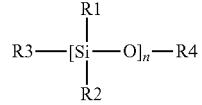

Formula III wherein, for each repeating polymer unit, R1, R2 and R3 are independently selected from the group consisting of alkyl, aryl, reactive glycidoxy groups having up to 20 carbon atoms, and OSi(OR5)3 groups, wherein each R5 independently has the same meaning as R1, R2 or R3, and R4 is either alkyl, aryl or hydrogen, and wherein n is selected such that the molecular weight of the polysiloxane is in the range of 500 to 2000; and, b) an organo functional silane with two hydrolysable groups having the formula wherein R1 is selected from the group consisting of alkyl, aryl, reactive glycidoxy, amino, mercapto, vinyl, isocyanate or methacrylate groups having up to 20 carbon atoms; R2 is selected from the group consisting of reactive glycidoxy, amino, mercapto, vinyl, isocyanate or methacrylate groups having up to 20 carbon atoms; and R3 and R4 are halogen or alkoxy, ketoxime or acetoxy groups having up to six carbon atoms; wherein the coating composition has a solids content of at least 60% by weight.

Still other suitable silicon-based resins may comprise a silane coupling agent and a polymer having a reactive silicon end group. In some embodiments, these suitable silicon-based resins may also include a catalyst operable to facilitate the curing of the polymer, a diluent, a dehydrating agent, and/or a filler material. Generally, any suitable polymer that can be prepared with reactive silicon end groups may be used. Examples of suitable polymers may include, but are not limited to, a polyalkyl (e.g., polyethers, polyalkanes, polyalkenes, polyalkynes, and the like), a substituted alkyl monomer (e.g., styrene), an acrylic, and any combination thereof. Examples of suitable reactive silicon end groups may include, but are not limited to, triethoxysilanes, methyldiethoxysilanes, trisilanols, alkoxysilanes, substituted silanes, multi-silanols, and any combination thereof. One suitable polymer having a reactive silicon end group that may be used in particular embodiments of the present disclosure is a silane-modified poly(propylene oxide) oligomer.

Generally, any suitable silane coupling agent may be used in accordance with particular embodiments of the present disclosure. Examples of suitable silane coupling agents may include, but are not limited to, N-2-(aminoethyl)-3-aminopropyltrimethoxysilane, 3-glycidoxypropyltrimethoxysilane, gamma-aminopropyltriethoxysilane, N-beta-(aminoethyl)-gamma-aminopropyltrimethoxysilanes, aminoethyl-N-beta-(aminoethyl)-gamma-aminopropyl-trimethoxysilanes, gamma-ureidopropyl-triethoxysilanes, beta-(3-4 epoxy-cyclohexyl)-ethyl-trimethoxysilane, gamma-glycidoxypropyltrimethoxysilane, vinyltrichlorosilane, vinyltris (beta-methoxyethoxy) silane, vinyltriethoxysilane, vinyltrimethoxysilane, 3-metacryloxypropyltrimethoxysilane, beta-(3,4 epoxycyclohexyl)-ethyltrimethoxysilane, r-glycidoxypropyltrimethoxysilane, r-glycidoxypropylmethylidiethoxysilane, N-beta-(aminoethyl)-r-aminopropyl-trimethoxysilane, N-beta-(aminoethyl)-r-aminopropylmethyldimethoxysilane, 3-aminopropyl-triethoxysilane, N-phenyl-r-aminopropyltrimethoxysilane, r-mercaptopropyltrimethoxysilane, r-chloropropyltrimethoxysilane, vinyltris (beta-methoxyethoxy) silane, r-metacryloxypropyltrimethoxysilane, r-glycidoxypropyltrimethoxysilane, r-glycidoxypropylmethylidiethoxysilane, N-beta-(aminoethyl)-r-aminopropyltrimethoxysilane, N-beta-(aminoethyl)-r-aminopropylmethyldimethoxysilane, r-aminopropyltriethoxysilane, N-[3-(trimethoxysilyl)propyl]-ethylenediamine, substituted silanes where one or more of the substitutions contains a different functional group, and any combination thereof.

In some embodiments, the silane coupling agent may be present in the silicon-based resin composition in an amount of from about 0.1% to about 5% by weight of the composition, and preferably in an amount from about 0.5% to about 3% by weight of the composition, encompassing any value and any subset therebetween.

In some embodiments, the consolidation agent may comprise a zeta potential-modifying aggregating composition, which can modify the zeta potential or aggregation potential of a proppant particulate surface. Such modifications can permit any two surfaces (e.g., of two or more particulates, or faces of a formation, or both) to have a greater attraction for one another.

Zeta potential-modifying aggregating compositions suitable for use in the embodiments of the present disclosure may include, but are not limited to, a reaction product of an amine and a phosphate ester, where the zeta potential-modifying aggregating composition is designed to coat a proppant particulate surface to change the zeta potential or aggregation potential of the surface of a proppant particulate.

Suitable amines may include, but are not limited to, any amine that is capable of reacting with a suitable phosphate ester to form a composition that forms a deformable coating on a proppant particulate surface. Exemplary examples of such amines may include, but are not limited to, any amine of the general formula R1,R2NH or mixtures or combinations thereof, where R1 and R2 are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur, and any combination thereof and where one or more of the hydrogen atoms can be replaced by one or more single valence atoms selected from the group consisting of fluorine, chlorine, bromine, iodine, and any combination thereof. Exemplary examples of amines suitable for use in the embodiments herein may include, but are not limited to, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixtures of alkyl indoles, imidazole and alkyl imidazole or mixtures of alkyl imidazole, quinoline and alkyl quinoline or mixtures of alkyl quinoline, isoquinoline and alkyl isoquinoline or mixtures of alkyl isoquinoline, pyrazine and alkyl pyrazine or mixtures of alkyl pyrazine, quinoxaline and alkyl quinoxaline or mixtures of alkyl quinoxaline, acridine and alkyl acridine or mixtures of alkyl acridine, pyrimidine and alkyl pyrimidine or mixtures of alkyl pyrimidine, quinazoline and alkyl quinazoline or mixtures of alkyl quinazoline, and any combination thereof.

Suitable phosphate esters may include, but are not limited to, any phosphate ester that is capable of reacting with a suitable amine to form a composition that forms a deformable coating on a proppant particulate surface. Exemplary examples of such phosphate esters may include, but are not limited to, any phosphate esters of the general formula P(O)(OR3)(OR4)(OR5) or mixtures or combinations thereof, where R3, R4, and OR5 are independently a hydrogen atom or a carbyl group having between about 1 and 40 carbon atoms, and the required hydrogen atoms to satisfy the valence and where one or more of the carbon atoms can be replaced by one or more hetero atoms selected from the group consisting of boron, nitrogen, oxygen, phosphorus, sulfur, and any combination thereof; and where one or more of the hydrogen atoms can be replaced by one or more single valence atoms selected from the group consisting of fluorine, chlorine, bromine, iodine, and any combination thereof. Exemplary examples of phosphate esters may include, but are not limited to, phosphate ester of alkanols having the general formula P(O)(OH)x(OR6)y where x+y=3 and are independently a hydrogen atom or a carbyl group having between about 1 and 40 carbon atoms, and the required hydrogen atoms to satisfy the valence and where one or more of the carbon atoms can be replaced by one or more hetero atoms selected from the group consisting of boron, nitrogen, oxygen, phosphorus, sulfur, and any combination thereof; and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates, and any combination thereof.

Other exemplary examples of phosphate esters may include, but are not limited to, phosphate esters of alkanol amines having the general formula N[R7OP(O)(OH)2]3 where R7 is a carbenyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur, and any combination thereof; and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine, and any combination thereof. Other exemplary examples of phosphate esters may include, but are not limited to, phosphate esters of hydroxylated aromatics, such as phosphate esters of alkylated phenols such as nonylphenyl phosphate ester or phenolic phosphate esters. Other exemplary examples of phosphate esters may include, but are not limited to, phosphate esters of diols and polyols such as phosphate esters of ethylene glycol, propylene glycol, or higher glycolic structures.

In some embodiments, the consolidation agent may comprise a consolidation agent emulsion that comprises an aqueous fluid, an emulsifying agent, and a consolidation agent. The consolidation agent in suitable emulsions may be either a non-aqueous tackifying agent or a resin, such as those described above. These consolidation agent emulsions have an aqueous external phase and organic-based internal phase. The term "emulsion" and all grammatical variants thereof, as used herein, refers to a combination of two or more immiscible phases and includes, but is not limited to, dispersions and suspensions.

Suitable consolidation agent emulsions comprise an aqueous external phase comprising an aqueous fluid. Suitable aqueous fluids that may be used in the consolidation agent emulsions of the embodiments of the present disclosure include any of those listed above with reference to the aqueous base fluids included in the fluids described herein. The aqueous fluid may be present in the consolidation agent emulsions in an amount in the range of from about 20% to about 99.9% by weight of the consolidation agent emulsion composition, encompassing any value and any subset therebetween. In some embodiments, the aqueous fluid may be present in the consolidation agent emulsions in an amount in the range of about 60% to 99.9% by weight of the consolidation agent emulsion composition. In other embodiments, the aqueous fluid may be present in the consolidation agent emulsions in an amount in the range of about 95% to 99.9% by weight of the consolidation agent emulsion composition.

The consolidation agent in the emulsion may be either a non-aqueous tackifying agent or a resin, such as those described above. The consolidation agents may be present in a consolidation agent emulsion in an amount in the range of from about 0.1% to about 80% by weight of the consolidation agent emulsion composition, encompassing any value and any subset therebetween. In some embodiments, the consolidation agent may be present in a consolidation agent emulsion in an amount in the range of about 0.1% to about 40% by weight of the composition. In some embodiments, the consolidation agent may be present in a consolidation agent emulsion in an amount in the range of about 0.1% to about 5% by weight of the composition.

In certain embodiments, the consolidation agent emulsions may further comprise an emulsifying agent. Examples of suitable emulsifying agents may include, but are not limited to, surfactants, proteins, hydrolyzed proteins, lipids, glycolipids, and nano-sized particulates, including, but not limited to, fumed silica. Combinations of these may be suitable as well.

In some embodiments, the consolidation agent may also comprise an optional catalyst to facilitate curing. Generally, any suitable catalyst may be used with the consolidation agent described herein. Examples of suitable catalysts may include, but are not limited to, tertiary amine catalysts, titanium chelate catalysts, tin catalysts, lead catalysts, bismuth catalysts, and any combination thereof. One suitable catalyst that may be used in particular embodiments of the present disclosure is dibutylbis(2,4-pentanedionate-O,O')—, (OC-6-11). In some embodiments, the catalyst may be present in an amount from about 0.1% to about 5% by weight of the consolidation agent, and preferably in an amount from about 1% to about 3% by weight of the composition, encompassing any value and any subset therebetween.

In some embodiments, the treatment fluids described herein may further comprise an additive, provided that the additive does not interfere with the formation of a complex fracture network or fluidic seal of the present disclosure. Suitable additives may include, but are not limited to, a salt, a weighting agent, an inert solid, an emulsifier, a dispersion aid, a corrosion inhibitor, an emulsion thinner, an emulsion thickener, a surfactant, a lost circulation material, a pH control additive, a biocide, a stabilizer, a fluid loss control agent, a scale inhibitor, a gas hydrate inhibitor, an oxidizer, a reducer, a clay stabilizing agent, and any combination thereof.

In various embodiments, systems configured for delivering the treatment fluids and proppant fluids (collectively referred to simply as "fluids" below) described herein to a downhole location are described. In various embodiments, the systems can comprise a pump fluidly coupled to a tubular, the tubular containing the fluids described herein. It will be appreciated that while the system described below may be used for delivering either or both of the treatment fluid and/or proppant fluid, each fluid is delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the fluids to a subterranean formation at or above a fracture gradient of the subterranean formation, but it may also be used in cases where fracturing is not desired. In some embodiments, the high pressure pump may be capable of fluidly conveying particulate matter, such as the micro-sized proppant particulates and/or the micro-sized proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the fluids to the high pressure pump. In such embodiments, the low pressure pump may "step up" the pressure of the fluids before reaching the high pressure pump.

In some embodiments, the systems described herein can further comprise a mixing tank that is upstream of the pump and in which the fluids are formulated. In various embodiments, the pump (e.g., a low pressure pump, a high pressure pump, or a combination thereof) may convey the fluids from the mixing tank or other source of the fluids to the tubular. In other embodiments, however, the fluids may be formulated offsite and transported to a worksite, in which case the fluid may be introduced to the tubular via the pump directly from its shipping container (e.g., a truck, a railcar, a barge, or the like) or from a transport pipeline. In either case, the fluids may be drawn into the pump, elevated to an appropriate pressure, and then introduced into the tubular for delivery downhole.

FIG. 3 shows an illustrative schematic of a system that can deliver the treatment fluids (i.e., the high-viscosity pad fluid and the low-viscosity micro-proppant fluid, macro-proppant fluid, and diversion fluid) of the present disclosure to a downhole location, according to one or more embodiments. It should be noted that while FIG. 3 generally depicts a land-based system, it is to be recognized that like systems may be operated in subsea locations as well. As depicted in FIG. 3, system 1 may include mixing tank 10, in which the fluids of the embodiments herein may be formulated. The fluids may be conveyed via line 12 to wellhead 14, where the fluids enter tubular 16, tubular 16 extending from wellhead 14 into subterranean formation 18. Upon being ejected from tubular 16, the fluids may subsequently penetrate into subterranean formation 18. Pump 20 may be configured to raise the pressure of the fluids to a desired degree before introduction into tubular 16. It is to be recognized that system 1 is merely exemplary in nature and various additional components may be present that have not necessarily been depicted in FIG. 3 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 3, the fluid or a portion thereof (e.g., the broken fluid) may, in some embodiments, flow back to wellhead 14 and exit subterranean formation 18. In some embodiments, the fluid that has flowed back to wellhead 14 may subsequently be recovered and recirculated to subterranean formation 18, or otherwise treated for use in a subsequent subterranean operation or for use in another industry.

It is also to be recognized that the disclosed fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 3.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include:

Embodiment A: A method comprising: (a) creating or extending a first main fracture with a pad fluid at a first treatment interval through a first opening in a wellbore into a subterranean formation, wherein the pad fluid is a high-viscosity fluid and is introduced at a first flow rate; (b) alternatingly introducing a micro-proppant fluid with the pad fluid at the first treatment interval and at the first flow rate, wherein the micro-proppant fluid is a low-viscosity fluid comprising micro-sized proppant particulates; (c) creating or extending a first branch fracture extending from the first main fracture with the alternatingly introduced micro-proppant fluid, whereby at least a portion of the micro-sized proppant particulates enter into the first branch fracture and form at least a partial monolayer of micro-sized proppant particulates therein; and (d) introducing a macro-proppant fluid through the first opening at a second flow rate, wherein the macro-proppant fluid is a low-viscosity fluid comprising macro-sized proppant particulates, and whereby at least a portion of the macro-sized proppant particulates enter into the first main fracture and form a proppant pack of macro-sized proppant particulates therein.

Embodiment A may have one or more of the following additional elements in any combination:

Element A1: Wherein the pad fluid and the micro-proppant fluid are substantially immiscible.

Element A2: Wherein the first opening is a cluster of perforations or a cluster of slots, and further comprising performing steps (a) through (d) at least two perforations in the cluster of perforations, or at least two slots in the cluster of slots.

Element A3: Further comprising repeating steps (a) through (d) a second treatment zone having a second opening in the wellbore into the subterranean formation.

Element A4: Further comprising repeating steps (a) through (d) a second treatment zone having a second opening in the wellbore into the subterranean formation, and wherein the second opening is a perforation, a cluster of perforations, a slot, or a cluster of slots.

Element A5: Wherein a fluid selected from the group consisting of the pad fluid, the micro-proppant fluid, the macro-proppant fluid, and any combination thereof further comprises a breaker, a consolidating agent, or both a breaker and a consolidating agent.

Element A6: Further comprising introducing a spacer fluid after step (c) and before step (d), the spacer fluid comprising a base fluid and a breaker.

Element A7: Wherein the alternatingly introduced pad fluid and micro-proppant fluid are in a volumetric ratio of pad fluid:micro-proppant fluid in an amount of from about 10:1 to about 0.1:1.

Element A8: Wherein the pad fluid has a viscosity of about 100 cP to about 20000 cP at a shear rate of 40 $\sec^{-1}$ at room temperature.

Element A9: Wherein the micro-proppant fluid has a viscosity of about 1 cP to about 200 cP at a shear rate of 40 $\sec^{-1}$ at room temperature.

Element A10: Wherein the macro-proppant fluid has a viscosity of about 1 cP to about 200 cP at a shear rate of 40 $\sec^{-1}$ at room temperature.

Element A11: Further comprising creating or extending at least a second branch fracture extending from the first main fracture.

Element A12: Wherein the micro-sized proppant particulates have a particle size distribution of about 0.1 μm to about 150 μm, and wherein the macro-sized proppant particulates have a particle size distribution in the range of about 100 μm to about 800 μm.

Element A13: Wherein the first flow rate is about 0.79 m³/min to about 15.9 m³/min, and the second flow rate is about 0.79 m³/min to about 15.9 m³/min.

Element A14: Further comprising (e) introducing a far-field diversion fluid through the first opening, wherein the far-field diversion fluid is a low-viscosity fluid comprising degradable diversion agents, and placing the degradable diversion agents from the far-field diversion fluid into a mouth of the first branch fracture, so as to form a far-field fluidic seal between the first main fracture and through the first branch fracture prior to step (d).

Element A15: Further comprising (e) introducing a far-field diversion fluid through the first opening, wherein the far-field diversion fluid is a low-viscosity fluid comprising degradable diversion agents, and placing the degradable diversion agents from the far-field diversion fluid into a mouth of the first branch fracture, so as to form a far-field fluidic seal between the first main fracture and through the first branch fracture prior to step (d), wherein the far-field diversion fluid has a viscosity of about 1 cP to about 200 cP at a shear rate of 40 $\sec^{-1}$ at room temperature.

Element A16: Further comprising (e) introducing a far-field diversion fluid through the first opening, wherein the far-field diversion fluid is a low-viscosity fluid comprising degradable diversion agents, and placing the degradable diversion agents from the far-field diversion fluid into a mouth of the first branch fracture, so as to form a far-field fluidic seal between the first main fracture and through the first branch fracture prior to step (d), wherein the degradable diversion agents in the far-field diversion fluid are fiber-shaped.

Element A17: Further comprising (e) introducing a far-field diversion fluid through the first opening, wherein the far-field diversion fluid is a low-viscosity fluid comprising degradable diversion agents, and placing the degradable diversion agents from the far-field diversion fluid into a mouth of the first branch fracture, so as to form a far-field fluidic seal between the first main fracture and through the first branch fracture prior to step (d), and further comprising (f) introducing a near-wellbore diversion fluid through the first opening, wherein the near-wellbore diversion fluid is a low-viscosity fluid comprising degradable diversion agents, and placing the degradable diversion agents from the near-wellbore diversion fluid into a mouth of the first opening, so as to form a near-wellbore fluidic seal between the wellbore and through the first opening after performing steps in order: (a) through (c), (e), and then (d).

Element A18: Further comprising (e) introducing a far-field diversion fluid through the first opening, wherein the far-field diversion fluid is a low-viscosity fluid comprising degradable diversion agents, and placing the degradable diversion agents from the far-field diversion fluid into a mouth of the first branch fracture, so as to form a far-field fluidic seal between the first main fracture and through the first branch fracture prior to step (d), and further comprising (f) introducing a near-wellbore diversion fluid through the first opening, wherein the near-wellbore diversion fluid is a low-viscosity fluid comprising degradable diversion agents, and placing the degradable diversion agents from the near-wellbore diversion fluid into a mouth of the first opening, so as to form a near-wellbore fluidic seal between the wellbore and through the first opening after performing steps in order: (a) through (c), (e), and then (d), wherein the degradable diversion agents in the far-field diversion fluid are fiber-shaped, and wherein the degradable diversion agents in the near-wellbore diversion fluid are fiber-shaped.

Element A19: further comprising (e) introducing a near-wellbore diversion fluid through the first opening, wherein the near-wellbore diversion fluid is a low-viscosity fluid comprising degradable diversion agents, and placing the degradable diversion agents from the near-wellbore diversion fluid into a mouth of the first opening, so as to form a near-wellbore fluidic seal between the wellbore and through the first opening.

Element A20: Further comprising (e) introducing a near-wellbore diversion fluid through the first opening, wherein the near-wellbore diversion fluid is a low-viscosity fluid comprising degradable diversion agents, and placing the degradable diversion agents from the near-wellbore diversion fluid into a mouth of the first opening, so as to form a near-wellbore fluidic seal between the wellbore and through the first opening, wherein the degradable diversion agents are fiber-shaped.

By way of non-limiting example, exemplary combinations applicable to A include: A1, A3, A5, and A17; A1, A4, and A19; A6, A9, A10, and A20; A5 and A20; A3, A4, A7, A8, and A15; A1 and A19; A2, A6, and A7; A15 and A16; A11 and A14; A4, A8, A9, and A10; A12, A13, and A15; A14 and A17; A8, A11, A12, and A20; and the like.

Embodiment B: A system comprising: a tubular extending into a wellbore in a subterranean formation; and a pump fluidly coupled to tubular, the tubular containing first alternatingly a pad fluid and a micro-proppant fluid, and thereafter a macro-proppant fluid, wherein the pad fluid and the micro-proppant fluid are alternatingly contained in the tubular at a first flow rate in the range of about 0.79 m³/min to about 15.9 m³/min, the pad fluid being a high-viscosity fluid and the micro-proppant fluid being a low-viscosity fluid comprising micro-sized proppant particulates, and wherein the alternatingly contained pad fluid and micro-proppant fluid are in a volumetric ratio of pad fluid:micro-proppant fluid in an amount of from about 10:1 to about 0.1:1, and wherein the macro-proppant fluid is contained thereafter in the tubular at a second flow rate in the range of about 0.79 m³/min to about 15.9 m³/min, the macro-proppant fluid being a low-viscosity fluid comprising macro-sized proppant particulates.

Embodiment B may have one or more of the following additional elements in any combination:

Element B1: Wherein the pad fluid and the micro-proppant fluid are substantially immiscible.

Element B2: Wherein the first opening is a perforation, a cluster of perforations, a slot, or a cluster of slots.

Element B3: Wherein a fluid selected from the group consisting of the pad fluid, the micro-proppant fluid, the macro-proppant fluid, and any combination thereof further comprises a breaker, a consolidating agent, or both a breaker and a consolidating agent.

Element B4: Wherein the pad fluid has a viscosity of about 100 cP to about 20000 cP at a shear rate of 40 sec$^{-1}$ at room temperature.

Element B5: Wherein the micro-proppant fluid has a viscosity of about 1 cP to about 200 cP at a shear rate of 40 sec$^{-1}$ at room temperature.

Element B6: Wherein the macro-proppant fluid has a viscosity of about 1 cP to about 200 cP at a shear rate of 40 sec$^{-1}$ at room temperature.

Element B7: Wherein the micro-sized proppant particulates have a particle size distribution of about 0.1 μm to about 150 μm, and wherein the macro-sized proppant particulates have a particle size distribution in the range of about 100 μm to about 800 μm.

By way of non-limiting example, exemplary combinations applicable to B include: B2, B4, and B7; B1-B7; B2, B3, and B5; B1 and B6; B3, B4, and B7; and the like.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   (a) creating or extending a first main fracture with a pad fluid at a first treatment interval through a first opening in a wellbore into a subterranean formation, wherein the pad fluid is a high-viscosity fluid and is introduced at a first flow rate;
   (b) then alternatingly introducing a micro-proppant fluid with the pad fluid at the first treatment interval and at the first flow rate, wherein the micro-proppant fluid is a low-viscosity fluid comprising micro-sized proppant particulates;
   (c) then creating or extending a first branch fracture extending from the first main fracture with the alternatingly introduced micro-proppant fluid, whereby at least a portion of the micro-sized proppant particulates enter into the first branch fracture and form at least a partial monolayer of micro-sized proppant particulates therein; whereby the first main fracture continues to grow in length as the first branch fracture is created or extended; and
   (d) then introducing a macro-proppant fluid through the first opening at a second flow rate,
   wherein the macro-proppant fluid is a low-viscosity fluid comprising macro-sized proppant particulates, and whereby at least a portion of the macro-sized proppant particulates enter into the first main fracture and form a proppant pack of macro-sized proppant particulates therein; wherein the high-viscosity fluid has a viscosity of about 100 cP to about 20000 cP at a shear rate of 40 sec$^{-1}$ at room temperature and the low-viscosity fluids each have a viscosity of about 1 cP to about 200 cP at a shear rate of 40 sec$^{-1}$ at room temperature.

2. The method of claim 1, wherein the pad fluid and the micro-proppant fluid are substantially immiscible.

3. The method of claim 1, wherein the first opening is a perforation, a cluster of perforations, a slot, or a cluster of slots.

4. The method of claim 1, wherein the first opening is a cluster of perforations or a cluster of slots, and further comprising performing steps (a) through (d) through at least two perforations in the cluster of perforations, or at least two slots in the cluster of slots.

5. The method of claim 1, further comprising repeating steps (a) through (d) at a second treatment zone having a second opening in the wellbore into the subterranean formation.

6. The method of claim 5, wherein the second opening is a perforation, a cluster of perforations, a slot, or a cluster of slots.

7. The method of claim 1, wherein a fluid selected from the group consisting of the pad fluid, the micro-proppant fluid, the macro-proppant fluid, and any combination thereof further comprises a breaker, a consolidating agent, or both a breaker and a consolidating agent.

8. The method of claim 1, further comprising introducing a spacer fluid after step (c) and before step (d), the spacer fluid comprising a base fluid and a breaker.

9. The method of claim 1, wherein the alternatingly introduced pad fluid and micro-proppant fluid are in a volumetric ratio of pad fluid: micro-proppant fluid in an amount of from about 10:1 to about 0.1:1.

10. The method of claim 1, further comprising creating or extending at least a second branch fracture extending from the first main fracture.

11. The method of claim 1, wherein the micro-sized proppant particulates have a particle size distribution of about 0.1 µm to about 150 µm, and wherein the macro-sized proppant particulates have a particle size distribution in the range of about 100 µm to about 800 µm.

12. The method of claim 1, wherein the first flow rate is about 0.79 m$^3$/min to about 15.9 m$^3$/min, and the second flow rate is about 0.79 m$^3$/min to about 15.9 m$^3$/min.

13. The method of claim 1, further comprising (e) introducing a far-field diversion fluid through the first opening, wherein the far-field diversion fluid has a viscosity of about 1 cP to about 200 cP at a shear rate of 40 sec$^{-1}$ at room temperature, the far-field diversion fluid comprising degradable diversion agents, and placing the degradable diversion agents from the far-field diversion fluid into a mouth of the first branch fracture, so as to form a far-field fluidic seal between the first main fracture and through the first branch fracture prior to step (d).

14. The method of claim 13, wherein the degradable diversion agents in the far-field diversion fluid have an aspect ratio greater than 5.

15. The method of claim 13, further comprising (f) introducing a near-wellbore diversion fluid through the first opening, wherein the near-wellbore diversion fluid has a viscosity of about 1 cP to about 200 cP at a shear rate of 40 sec$^{-1}$ at room temperature, the near-wellbore diversion fluid comprising degradable diversion agents, and placing the degradable diversion agents from the near-wellbore diversion fluid into a mouth of the first opening, so as to form a near-wellbore fluidic seal between the wellbore and through the first opening after performing steps in order: (a) through (c), (e), and then (d).

16. The method of claim 15, wherein the degradable diversion agents in the near-wellbore diversion fluid have an aspect ratio greater than 5.

17. The method of claim 1, further comprising (e) introducing a near-wellbore diversion fluid through the first opening, wherein the near-wellbore diversion fluid has a viscosity of about 1 cP to about 200 cP at a shear rate of 40 sec$^{-1}$ at room temperature, the near-wellbore diversion fluid comprising degradable diversion agents, and placing the degradable diversion agents from the near-wellbore diversion fluid into a mouth of the first opening, so as to form a near-wellbore fluidic seal between the wellbore and through the first opening.

18. A system comprising:
a tubular extending into a wellbore in a subterranean formation; and
a pump fluidly coupled to the tubular, the tubular containing first alternatingly a pad fluid and a micro-proppant fluid, and thereafter a macro-proppant fluid,
wherein the pad fluid and the micro-proppant fluid are alternatingly contained in the tubular at a first flow rate in the range of about 0.79 m$^3$/min to about 15.9 m$^3$/min, the pad fluid being a high-viscosity fluid and the micro-proppant fluid being a low-viscosity fluid comprising micro-sized proppant particulates, and wherein the alternatingly contained pad fluid and micro-proppant fluid are in a volumetric ratio of pad fluid: micro-proppant fluid in an amount of from about 10:1 to about 0.1:1, wherein the system is configured such that the pad fluid creates or extends a first main fracture at a first treatment interval in the subterranean formation; wherein the system is further configured to create or extend a first branch fracture extending from the first main fracture with the alternatingly contained micro-proppant fluid, whereby at least a portion of the micro-sized proppant particulates enter into the first branch fracture and form at least a partial monolayer of micro-sized proppant particulates therein; whereby the first main fracture continues to grow in length as the first branch fracture is created or extended; and
wherein the macro-proppant fluid is contained thereafter in the tubular at a second flow rate in the range of about 0.79 m$^3$/min to about 15.9 m$^3$/min, the macro-proppant fluid being a low-viscosity fluid comprising macro-sized proppant particulates;
wherein the high-viscosity fluid has a viscosity of about 100 cP to about 20000 cP at a shear rate of 40 sec$^{-1}$ at room temperature and the low-viscosity fluids each have a viscosity of about 1 cP to about 200 cP at a shear rate of 40 sec$^{-1}$ at room temperature.

* * * * *